(12) United States Patent
Itoh et al.

(10) Patent No.: US 7,132,146 B2
(45) Date of Patent: *Nov. 7, 2006

(54) OPTICAL RECORDING MEDIUM

(75) Inventors: Hidetake Itoh, Tokyo (JP); Naoki Hayashida, Tokyo (JP); Kenji Yoneyama, Tokyo (JP); Kazushi Tanaka, Tokyo (JP); Tsuyoshi Komaki, Tokyo (JP); Kentaro Iida, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/834,105

(22) Filed: Apr. 29, 2004

(65) Prior Publication Data

US 2005/0013965 A1    Jan. 20, 2005

(30) Foreign Application Priority Data

| | | |
|---|---|---|
| May 9, 2003 | (JP) | P. 2003-131876 |
| May 14, 2003 | (JP) | P. 2003-135396 |
| Jun. 19, 2003 | (JP) | P. 2003-175126 |
| Jun. 19, 2003 | (JP) | P. 2003-175127 |
| Jun. 19, 2003 | (JP) | P. 2003-175128 |
| Jun. 19, 2003 | (JP) | P. 2003-175129 |
| Jun. 19, 2003 | (JP) | P. 2003-175130 |
| Jun. 19, 2003 | (JP) | P. 2003-175131 |
| Jun. 19, 2003 | (JP) | P. 2003-175132 |
| Jun. 19, 2003 | (JP) | P. 2003-175133 |

(51) Int. Cl.
*B32B 3/02* (2006.01)

(52) U.S. Cl. .................. 428/64.1; 428/64.4; 428/54.5; 430/270.13

(58) Field of Classification Search ............... 428/64.4, 428/64.5; 430/270.13
See application file for complete search history.

(56) References Cited

U.S. PATENT DOCUMENTS

2004/0234720 A1* 11/2004 Hayashida et al. ........ 428/64.4

(Continued)

FOREIGN PATENT DOCUMENTS

EP    0 552 636 A1    7/1993

(Continued)

OTHER PUBLICATIONS

U.S. Appl. No. 11/008,228, filed Dec. 10, 2004, Hayashida et al.

(Continued)

*Primary Examiner*—Elizabeth Mulvaney
(74) *Attorney, Agent, or Firm*—Oblon, Spivak, McClelland, Maier & Neustadt, P.C.

(57) ABSTRACT

The invention provides an optical recording disk, with which the worsening of jitter can be prevented effectively even when fingerprints become adhered onto a laser light incidence surface. An optical recording disk 10 comprises a substrate 2, a recording layer 5, formed on the substrate, a light transmitting layer 7, formed on the recording layer, and a hard coat layer 8, formed on the light transmitting layer, and is characterized in that, when an operation of adhering an artificial fingerprint solution onto the optical recording disk's light incidence surface, onto which laser light is made incident, is performed and then an operation of wiping off the artificial fingerprint solution that has been adhered onto the light incidence surface is repeated five times, jitter becomes no more than 1.15 times that prior to the adhesion of the artificial fingerprint solution.

9 Claims, 2 Drawing Sheets

U.S. PATENT DOCUMENTS

| | | |
|---|---|---|
| 2005/0013965 A1 | 1/2005 | Itoh et al. |
| 2005/0072336 A1* | 4/2005 | Itoh et al. .............. 106/287.28 |
| 2005/0106404 A1* | 5/2005 | Hayashida et al. ......... 428/522 |
| 2005/0158504 A1* | 7/2005 | Itoh et al. ................... 428/64.1 |

FOREIGN PATENT DOCUMENTS

| | | |
|---|---|---|
| JP | 6-349119 | 12/1994 |
| JP | 9-212913 | 8/1997 |
| JP | 10-110118 | 4/1998 |
| JP | 10-302311 | 11/1998 |
| JP | 11-185313 | 7/1999 |
| JP | 11-293159 | 10/1999 |
| JP | 2000-17572 | 1/2000 |
| JP | 2001-228302 | 8/2001 |
| JP | 2002-157784 | 5/2002 |
| JP | 2002-190136 | 7/2002 |
| JP | 2002-230837 | 8/2002 |
| JP | 2002-260280 | 9/2002 |
| JP | 2003-22571 | 1/2003 |
| JP | 2003-168248 | 6/2003 |
| JP | 2004-35824 | 2/2004 |
| JP | 2004-171711 | 6/2004 |
| JP | 2004-185772 | 7/2004 |
| WO | WO 03/029382 | 4/2003 |

OTHER PUBLICATIONS

U.S. Appl. No. 11/053,547, filed Feb. 9, 2005, Hayashida et al.
U.S. Appl. No. 11/053,371, filed Feb. 9, 2005, Hayashida et al.
U.S. Appl. No. 11/074,762, filed Mar. 9, 2005, Itoh et al.
U.S. Appl. No. 11/106,424, filed Apr. 15, 2005, Itoh et al.
U.S. Appl. No. 11/106,436, filed Apr. 15, 2005, Itoh et al.

* cited by examiner

OPTICAL RECORDING MEDIUM

BACKGROUND OF THE INVENTION

This invention concerns an optical recording disk, and to be more detailed, concerns an optical recording medium, with which the worsening of jitter can be prevented effectively even when fingerprints become adhered onto an incidence surface for laser light.

Optical recording disks, as represented by CDs and DVDs, have been used widely as recording media for recording digital data, and in recent years, optical recording disks of the next generation, which are greater in capacity and have higher data transferring rates, are being developed actively.

In developing a next-generation optical disk with greater capacity and higher data transferring rate, the beam spot diameter of a laser light used for the recording and reproduction of data must inevitably be made extremely small.

In order to make the beam spot diameter of a laser light small, the numerical aperture (NA) of an objective lens for converging the laser light must be made large and the wavelength $\lambda$ of the laser light must be made short, and the use of an objective lens with a numerical aperture (NA) of 0.85 to converge a laser light with wavelength $\lambda$ in the blue light range (wavelength of 380 to 450 nm) for recording data into a next-generation optical recording disk and reproducing data from the optical recording disk has been proposed.

However, when the numerical aperture (NA) of the objective lens for converging the laser light is made high, the tolerable angular error of the tilting of the optical axis of the laser light with respect to the optical recording medium, that is, the tilt margin T becomes extremely narrow. The tilt margin T decreases as the NA of the objective lens increases and increases as the thickness d of a light transmitting layer decreases. It is thus effective to make the thickness d of the light transmitting layer small in order to prevent the tilt margin T from becoming small.

Thus for a next-generation optical recording disk, the widening of the tilt margin by thinning of the light transmitting layer to approximately 100 µm has been proposed.

However, when the thickness of the light transmitting layer, through which laser light is transmitted, is thinned to approximately 100 µm, the area of the laser light beam spot on the top surface of the light transmitting layer becomes small. Error will thus tend to occur readily during the reading of data in cases where a laser light incidence surface of the light transmitting layer is flawed or has debris or fingerprints adhered thereon.

It has thus been proposed that a next-generation optical recording disk, which is arranged for illumination of laser light through a light transmitting layer and is premised on use in households, be used in a state in which it is housed in a cartridge.

However, that a next-generation optical recording disk cannot be used unless it is housed in a cartridge, despite CDs and DVDs being used in a so-called bare disk form in which the disk is not housed in a cartridge, is extremely inconvenient for users, and if it becomes essential for next-generation optical recording disks to be housed in cartridges, the next-generation optical recording disks will also become high in cost.

A next-generation optical recording disk, having a hard coat layer that is hard formed on the top surface of the light transmitting layer and can be used in the bare disk form, has thus been proposed.

Such an optical recording disk, having a hard coat layer that is hard formed on the top surface of the light transmitting layer, has the merit of not having to be housed in a cartridge and enabling use in the same manner as a CD or a DVD.

However on the other hand, since an optical recording disk, having a hard coat layer that is hard formed on the top surface of the light transmitting layer, is premised on use in the bare disk form, fingerprints tend to become adhered onto the surface of the hard coat layer, and when a fingerprint becomes adhered, the jitter during reading of data becomes large and error tends to occur readily.

SUMMARY OF THE INVENTION

Thus an object of this invention is to provide an optical recording disk, with which the worsening of jitter can be prevented effectively even when fingerprints become adhered onto a laser light incidence surface.

This invention's object can be achieved by an optical recording disk, comprising at least: a substrate; at least one recording layer, formed on the abovementioned substrate; and a light transmitting layer, formed on the abovementioned recording layer; and wherein when (a) an original plate for transfer of artificial fingerprint pattern is prepared by preparing an artificial fingerprint solution by mixing and stirring 0.4 weight parts of Kanto loam of Test Powder 1 Class 11 as defined in JIS Z8901, 1 weight part of triolein, and 10 weight parts of methoxypropanol, taking approximately 1 ml of the abovementioned artificial fingerprint solution thus prepared to spin coating the abovementioned artificial fingerprint solution onto a polycarbonate substrate, with a thickness of 1.1 mm and a diameter 120 mm, while spinning the abovementioned polycarbonate substrate at 500 rpm for 3 seconds and then spinning the abovementioned polycarbonate substrate at 250 rpm for 3 seconds, to form a coating film, and heating at 60° C. for 3 minutes, an artificial fingerprint transferring material is prepared by uniformly scouring an end face of a 12 mm diameter silicone rubber stopper using abrasive paper of base material Cw, polishing material A, and grain size P240 as defined in JISR6252 and adhering the abovementioned artificial fingerprint solution onto the abovementioned scoured end face of the abovementioned artificial fingerprint transferring material by pressing the abovementioned end face of the abovementioned artificial fingerprint transferring material against the abovementioned original plate for transfer of artificial fingerprint pattern at a load of 29N for 10 seconds, and the abovementioned end face of the abovementioned artificial fingerprint transferring material, onto which the abovementioned artificial fingerprint solution has been adhered, is pressed for 10 seconds at a load of 29N against a position 40 mm in the radial direction from the center of the abovementioned optical recording disk's light incidence surface, onto which laser light is to be made incident, to adhere the abovementioned artificial fingerprint solution onto the abovementioned light incidence surface (the above procedure shall be referred to hereinafter as the "artificial fingerprint solution examination (a)"), and an operation, of (b) pressing an end face of a 16 mm diameter silicone rubber stopper across eight overlapped facial tissues against the abovementioned light incidence surface, onto which the abovementioned artificial fingerprint solution has been adhered, at a pressure 4.9N and moving the abovementioned light incidence surface and the abovementioned silicone rubber stopper relative to each other to wipe off the abovementioned artificial fingerprint solution that has been adhered onto the abovementioned light incidence surface (the above procedure shall be referred to hereinafter as the "wipe-off operation (b)"), is repeated five times on the abovementioned optical disk, jitter becomes no more than 1.15 times that prior to the adhesion of the abovementioned artificial fingerprint solution.

The above object is also achieved by an optical recording disk, comprising at least: a substrate; at least one recording layer, formed on the abovementioned substrate; and a light transmitting layer, formed on the abovementioned recording layer; and wherein after storing for 50 hours under an environment of 80° C. and 85% relative humidity and then performing the artificial fingerprint adhesion (a) and thereafter repeating the wipe-off operation (b) ten times, jitter becomes no more than 1.15 times that prior to the adhesion of the abovementioned artificial fingerprint solution.

The above object is also achieved by an optical recording disk, comprising at least: a substrate; at least one recording layer, formed on the abovementioned substrate; and a light transmitting layer, formed on the abovementioned recording layer; and characterized in having surface characteristics such that after storing for 50 hours under an environment of 80° C. and 85% relative humidity, the contact angle of triolein with respect to the light incidence surface, onto which laser light is made incident, is no less than 38°.

The above object is also achieved by an optical recording disk, comprising at least: a substrate; at least one recording layer, formed on the abovementioned substrate; and a light transmitting layer, formed on the abovementioned recording layer; and characterized in having surface characteristics such that after storing for 50 hours under an environment of 80° C. and 85% relative humidity and then performing the artificial fingerprint solution examination (a), the area proportion occupied by the abovementioned artificial fingerprint solution adhered within a unit area of the abovementioned light incidence surface is no more than 30%.

The above object is also achieved by an optical recording disk, comprising at least: a substrate; at least one recording layer, formed on the abovementioned substrate; and a light transmitting layer, formed on the abovementioned recording layer; and characterized in having surface characteristics such that when, after storing for 50 hours under an environment of 80° C. and 85% relative humidity, (c) a long-fiber, self-adhering nonwoven fabric, having cellulose as the main component, is soaked with ethanol, the abovementioned long-fiber, self-adhering nonwoven fabric soaked with ethanol is pressed against a light incidence surface of the abovementioned optical recording disk, onto which laser light is to be made incident, at a load of 4.9N±0.1N/cm$^2$, and the abovementioned light incidence surface is rubbed with the abovementioned long-fiber, self-adhering nonwoven fabric by moving the abovementioned long-fiber, self-adhering nonwoven fabric and the abovementioned light incidence surface relative to each other for ten reciprocations (the above procedure shall be referred to hereinafter as the "rub test (c)"), the contact angle of triolein with respect to the light incidence surface, onto which laser light is made incident, is no less than 38°.

The above object is also achieved by an optical recording disk, comprising at least: a substrate; at least one recording layer, formed on the abovementioned substrate; and a light transmitting layer, formed on the abovementioned recording layer; and wherein after storing for 50 hours under an environment of 80° C. and 85% relative humidity, then performing the rub test (c), and thereafter performing the artificial fingerprint adhesion (a), the area proportion occupied by the abovementioned artificial fingerprint solution adhered within a unit area of the abovementioned light incidence surface is no more than 30%.

The above object is also achieved by an optical recording disk, comprising at least: a substrate; at least one recording layer, formed on the abovementioned substrate; and a light transmitting layer, formed on the abovementioned recording layer; and characterized in having surface characteristics such that after performing the rub test (c), the contact angle of triolein with respect to the light incidence surface, onto which laser light is made incident, is no less than 40°.

The above object is also achieved by an optical recording disk, comprising at least: a substrate; at least one recording layer, formed on the abovementioned substrate; and a light transmitting layer, formed on the abovementioned recording layer; and characterized in having surface characteristics such that after performing the rub test (c) and then performing the artificial fingerprint adhesion (a), the area proportion occupied by the abovementioned artificial fingerprint solution adhered within a unit area of the abovementioned light incidence surface is no more than 30%.

The above object is also achieved by an optical information medium characterized in that when an evaluation dispersion, containing 0.4 weight parts of Kanto loam of Test Powder 1 Class 11 as defined in JIS Z8901 as a microparticulate substance, 1 weight part of triolein as a dispersion medium, and 10 weight parts of methoxypropanol as a diluent, is adhered onto a recording and/or reproduction beam incidence side surface of the optical information medium by the steps of:

A. coating the evaluation dispersion by spin coating onto a polycarbonate substrate, which is to serve as an original plate for evaluation dispersion transfer;

B. preparing a transferring material, made of silicone rubber;

C. pressing the transferring material at a fixed load of 4.9N for 10 seconds against the prepared original plate's surface, on which the evaluation dispersion was coated, to transfer the evaluation dispersion components onto the transferring material;

D. pressing the transferring material, onto which the evaluation dispersion components have been transferred, at a fixed load of 4.9N for 10 seconds against a surface of a polycarbonate substrate for adhesion amount reduction to reduce the adhesion amount of the evaluation dispersion components;

E. pressing the transferring material, with which the adhesion amount of the evaluation dispersion components have been reduced, at a fixed load of 4.9N for 10 seconds against another location of the surface of the polycarbonate substrate for adhesion amount reduction to reduce the adhesion amount of the evaluation dispersion components further; and F. pressing the transferring material, with which the adhesion amount of the evaluation dispersion components have been reduced twice, at a fixed load of 4.9N for 10 seconds against the recording and/or reproduction beam incidence side surface of the optical information medium to adhere the evaluation dispersion components onto the abovementioned surface of the optical information medium;

the area proportion occupied by the adhered evaluation dispersion drops with respect to the unit area of the surface on which the adhesion operation was performed is no more than 6%.

DETAILED DESCRIPTION OF THE PREFERRED EMBODIMENTS

Preferred embodiments of this invention shall now be described in detail based on the attached drawings.

Figure 1:
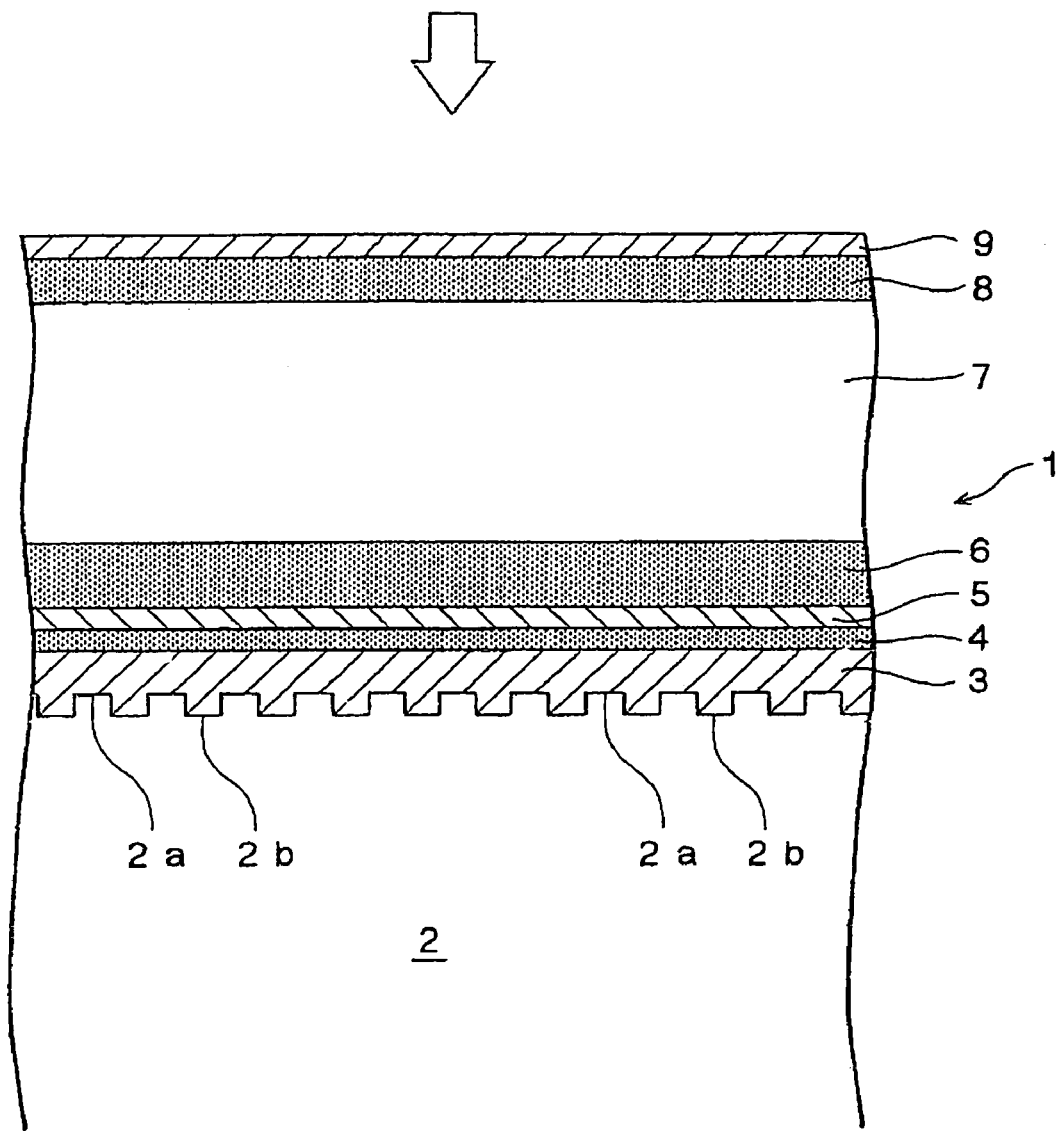
FIG. 1 is a schematic enlarged sectional view of an optical recording disk of a preferred embodiment of this invention.

FIG. 1 is a schematic enlarged sectional view of an optical recording disk of a preferred embodiment of this invention.

As shown in FIG. 1, an optical recording disk 1 of this embodiment is arranged so that laser light is illuminated from the direction indicated by the arrow.

As shown in FIG. 1, optical recording disk 1 of this embodiment has a substrate 2, a reflecting layer 3, formed on the top surface of substrate 2, a second dielectric layer 4, formed on the top surface of reflecting layer 3, a recording layer 5, formed of a phase-change film and formed on the top surface of second dielectric layer 4, a first dielectric layer 6, formed on the top surface of recording layer 5, a light transmitting layer 7, formed on the top surface of first dielectric layer 6, a hard coat layer 8, formed on the top surface of light transmitting layer 7, and a lubricant layer (surface thin layer) 9, formed on the top surface of hard coat layer 8. Here, the top surface of the lubricant layer becomes a light incidence surface onto which laser light is illuminated.

The material for forming substrate 2 is not limited in particular as long as it can function as a supporting member of light recording disk 1, and substrate 2 may be formed, for example, of glass, ceramic, resin, etc. Among these, a resin is preferably used from the standpoint of ease of forming. Among resins, polycarbonate resin is especially preferable from the point of processability, optical characteristics, etc., and in the present embodiment, substrate 2 is formed of a polycarbonate resin.

As shown in FIG. 1, grooves 2a and lands 2b are formed alternatingly on the top surface of substrate 2. The pitch of grooves 2a is preferably set to 0.2 µm or 0.4 µm for blue laser recording. Reflecting layer 3 is formed on the top surface of substrate 2. It is sufficient that the material for forming reflecting layer be able to reflect laser light, and a metal, alloy, or other known material may be used.

With an optical information medium and/or system (drive), with which blue laser light (wavelength: 380 to 450 nm) is used and the minimum diameter of a recording/reproduction beam on the recording/reproduction beam incidence side surface is no more than 500 µm, the problem of the worsening of the error rate tends to occur readily, especially when fingerprints, etc. become adhered onto the recording/reproduction beam incidence side surface during use. When a large amount of fingerprints, etc. become adhered, not only does the error rate worsen but tracking becomes disrupted.

The influence of fingerprint adhesion on recording/reproduction characteristics depends on the diameter of a laser beam (the minimum diameter in the case where the beam cross section is elliptical) on a laser beam incidence side surface of a medium, and when this diameter is small, the influence is greater and continuous errors, for which error correction is impossible, may occur, etc. Research by the present inventors has shown that when the diameter of a laser beam on an incidence side surface of a medium is no more than 500 µm and especially no more than 300 µm, the adverse effects of fingerprints, which are adhered in the process of handling the medium, on recording/reproduction characteristics become significant. For example, with a Blu-ray Disc, the value of the diameter of the laser beam on the incidence side surface of the disk is approximately 130 µm.

Along with first dielectric layer 6, second dielectric layer 4 has functions of mechanically and chemically protecting recording layer 5 and adjusting the optical characteristics. The second dielectric layer is preferably formed of a metal-containing oxide, nitride, sulfide, or fluoride, or a composite of such compounds.

Recording layer 5 is formed of a phase-change film and may be formed of a known material, such as Ge—Sb—Te, In—Sb—Te, Sn—Se—Te, etc. Recording layer 5 is arranged to enable the recording and/or reproduction of data using blue laser light (wavelength: 380 nm to 450 nm).

Reflecting layer 3, second dielectric layer 4, first dielectric layer 6, and recording layer 5 can be formed by vacuum vapor adhesion or by sputtering or other gas-phase growth method.

Light transmitting layer 7 is a layer through which laser light is transmitted. The material for forming light transmitting layer 7 is required to be optically transparent, with as little optical absorption or reflection in the range of 390 nm to 420 nm, which is the wavelength range of the laser light that is used, and to be small in birefringence, and in a case where light transmitting layer 7 is formed by spin coating, etc., an ultraviolet curing resin, electron beam curing resin, thermosetting resin, etc. is used for forming light transmitting layer 7, and an ultraviolet curing resin, electron beam curing resin, or other active energy ray curing resin is used especially favorably.

Hard coat layer 8 has a function of protecting optical recording disk 1 and enabling optical recording disk 1 to be used without being housed in a cartridge.

With the present embodiment, the hard coat layer preferably contains a hard coat agent composition containing an active energy ray curing resin and inorganic microparticles with an average particle diameter of 100 nm or less. The hardness of the hard coat layer side is preferably B or more by the pencil hardness test.

In order to secure a tilt margin for the reading and/or recording of data using a blue laser, the film thickness of light transmitting layer 7 is preferably 1 µm to 150 µm. The film thickness of the hard coat layer is preferably 0.5 µm to 5 µm. In the case where a hard coat layer is formed above the light transmitting layer, the total thickness is preferably 70 µm to 150 µm.

The active energy ray curing resin that is used to form hard coat layer 8 is not restricted in particular as long as it is a compound having at least one active group selected from the group consisting of the (meth) acryloyl group, vinyl group, and mercapto group.

Examples of a compound with the (meth) acryloyl group that is used for forming the hard coat layer in this invention include trimethylolpropane tri(meth)acrylate, dipentaerythritol hexa(meth)acrylate, urethane acrylate, ester acrylates, etc.

In order to secure transparency, hard coat layer 8 contains inorganic microparticles with an average particle diameter of no less than 5 nm and no more than 100 nm and preferably inorganic microparticles with an average particle diameter of no less than 5 nm and no more than 20 nm.

Examples of the inorganic microparticles that are used to form hard coat layer 8 include microparticles of an oxide of a metal or semi-metal and microparticles of a sulfide of a metal or semi-metal, and silica microparticles are preferable. By adding such inorganic microparticles in the hard coat agent composition, the wear resistance of hard coat layer 8 can be improved further.

If necessary, the light transmitting layer and the hard coat layer may contain a non-polymerizing diluent, organic filler, anti-polymerization agent, antioxidant, ultraviolet absorber, light stabilizer, anti-foaming agent, leveling agent, pigment, silicon compound, etc.

The light transmitting layer and the hard coat layer can be formed by a known coating method, such as spin coating, gravure coating, etc. or by forming into a sheet form in advance and adhering using an adhesive agent.

Lubricant layer 9 contains an active energy ray curing type silicone-based compound and/or fluorine-based compound as the main component.

Examples of the silicone-based compound include compounds containing a silicone-based substituent and an active energy ray polymerizable reactive group, and examples of the fluorine-based compound include compounds containing a fluorine-based substituent and an active energy ray polymerizable reactive group.

Examples of the active energy ray polymerizable reactive group include active energy ray radical polymerizable reactive groups, such as the (meth) acryloyl group, vinyl group, mercapto group, etc., and active energy ray cation polymerizable reactive groups, such as cyclic ether groups, vinyl ether groups, etc.

Examples of the silicone-based compound contained in lubricant layer 9 include compounds having a part having a silicone-based substituent and at least one reactive group, selected from the group consisting of the (meth) acryloyl group, vinyl group, mercapto group, cyclic ether groups, and vinyl ether groups, and include the silicone-based compounds indicated by the following general formulae:

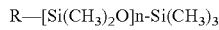

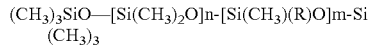

In the above, R is a substituent group containing at least one reactive group, selected from the group consisting of the (meth) acryloyl group, vinyl group, mercapto group, cyclic ether groups, and vinyl ether groups, and n and m are degrees of polymerization.

Fluorine-based methacrylate compounds, such as 2-(perfluoro-9-methyldecyl)ethyl (meth)acrylate, 2-(perfluoro-3,6,9-trioxatridecanoyloxy)ethyl methacrylate, perfluorocyclohexyl acrylate, and other fluoroacrylates, can be cited as examples of the fluorine-based compound contained in lubricant layer 9.

Examples of the fluorine-based compound contained in lubricant layer 9 also include compounds having a part having a fluorine-based substituent and at least one reactive group, selected from the group consisting of cyclic ether groups and vinyl ether groups. Specific examples include 3-(1H, 1H-perfluorooctyloxy)-1,2-epoxypropane, 3-(1H, 1H-perfluorodecyloxy)-1,2-epoxypropane, the diglycidyl ether of "Fombrin Z DOL" (trade name; alcohol modified perfluoropolyether), made by Ausimont, Inc., etc.

The thickness of lubricant layer 9 is preferably 1 nm to 100 nm. As the active energy ray curing silicone-based compound and/or fluorine-based compound, just one type of compound among those mentioned above may be used or two or more types of the compounds may be used in combination. Lubricant layer 9 is formed by applying a lubricant solution onto the surface of uncured hard coat layer 8 by spin coating, etc. to form a coat film of the lubricant solution and then irradiating with active energy rays to cure hard coat layer 8 and the coat film of the lubricant solution at the same time.

Figure 2:
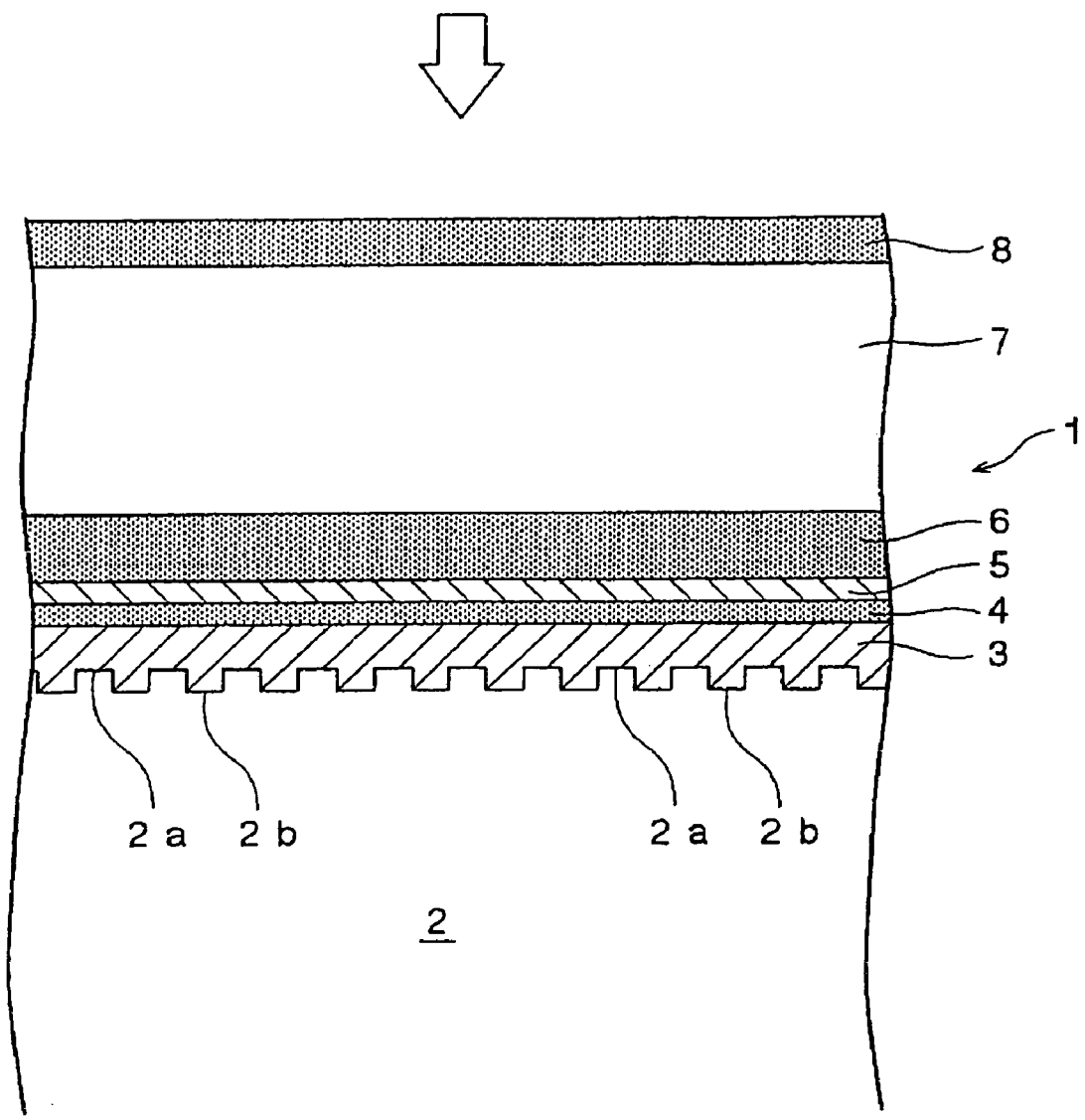
FIG. 2 is a schematic enlarged sectional view of an optical recording disk of another preferable embodiment of this invention.

FIG. 2 is a schematic enlarged sectional view of an optical recording disk of another preferable embodiment of this invention. Unlike optical recording disk 1 shown in FIG. 2, a lubricant layer is not formed on the top surface of a hard coat layer 8. Here, hard coat layer 8 contains a lubricant and the surface onto which laser light is made incident is formed by the top surface of hard coat layer 8.

In addition to containing an active energy ray curing resin and inorganic microparticles with an average particle diameter of no more than 100 nm, hard coat layer 8 of optical recording disk 10 of the present embodiment contains an active energy ray curing type silicone-based compound and/or fluorine-based compound as a lubricant. The same compounds contained in the lubricant layer may be used as the active energy ray curing type silicone-based compound and/or fluorine-based compound.

With this invention, in the case where the surface onto which laser light is made incident is formed by the top surface of hard coat layer 8, the hard coat agent composition for forming hard coat layer 8 preferably contains no less than 5 weight % and no more than 80 weight % of inorganic microparticles, no less than 0.01 weight % and no more than 1 weight % of the silicone-based compound and/or fluorine-based compound, and no less than 19 weight % and no more than 94.99 weight % of the active energy ray curing resin.

Though suitable active energy rays can be selected from among ultraviolet rays, electron beam, visible light, etc. as the active energy rays, the use of ultraviolet rays or an electron beam is preferable.

An artificial fingerprint solution to serve as an evaluation dispersion contains 0.4 weight parts of Kanto loam of Test Powder 1 Class 11 as defined in JIS Z8901 as a microparticulate substance, 1 weight part of triolein as a dispersion medium, and 10 weight parts of methoxypropanol as a diluent. This evaluation dispersion is the artificial fingerprint solution disclosed in Publication No. WO03/29382A1. Triolein is a skin oil component. The dispersion medium refers to just the liquid component that remains as an artificial fingerprint component after transfer onto a surface of an optical information medium that is to be evaluated and is distinguished from the diluent, the large part or the entirety of which evaporates in the final stage after transfer. By being arranged as a non-uniform system wherein Kanto loam, which is a suitable non-soluble component, is dispersed in triolein, which is a liquid component that is contained in actual fingerprints, the abovementioned evaluation dispersion is made to have properties that are as close to actual fingerprints as possible. Thus by preparing an artificial fingerprint that is equivalent to an actual fingerprint and adhering it onto an optical disk, an effect equivalent to adhering an actual fingerprint onto the optical disk can be provided. Also by using triolein, which is a liquid component that is contained in actual fingerprints, an effect close to the adhesion of an actual fingerprint onto an optical disk can be provided in a simple manner.

EXAMPLES

Examples shall now be described to further clarify the effects of this invention.

Example 1

A disk-form polycarbonate substrate, having a thickness of 1.1 mm, a diameter of 120 mm, and grooves and lands formed on one surface thereof, was prepared, and a reflecting layer, containing Al, Pd, and Cu at an atomic ratio of 98:1:1 and having a thickness of 100 nm, was formed by sputtering on the surface of the polycarbonate substrate on which grooves and lands were formed.

The depth of each groove was set to $\lambda/6$ as expressed by the optical path length of laser light of a wavelength $\lambda$ of 405 nm and the recording track pitch for on-groove recording was set to 0.32 µm.

Using a target comprising $Al_2O_3$, a second dielectric layer with a thickness of 20 nm was formed by sputtering onto the top surface of the reflecting layer, and furthermore on the top surface of the second dielectric layer, a recording layer with a thickness of 12 nm was formed by sputtering using an alloy target comprising a phase-change material. The composition of the recording layer in terms of atomic ratio was Sb74Te18 (Ge7In1).

Then using a target comprising a mixture of ZnS and $SiO_2$, a first dielectric layer, having a thickness of 130 nm, was formed by sputtering on the top surface of the recording layer. The mole ratio of ZnS and $SiO_2$ in the mixture of ZnS and $SiO_2$ was 80:20.

Furthermore, a radical polymerizable ultraviolet curing resin, with the composition given below, was coated onto the top surface of the first dielectric layer by spin coating to form a coating film, and the formed coating film was cured by illuminating with ultraviolet rays to form a light transmitting layer with a thickness of 98 µm.

| | |
|---|---|
| Urethane acrylate oligomer | 50 weight parts |
| Isocyanuric acid EO modified triacrylate | 10 weight parts |
| Isocyanuric acid EO modified diacrylate | 5 weight parts |
| Tetrahydrofurfuryl acrylate | 25 weight parts |
| Photopolymerization initiator (1-hydroxycyclohexylphenyl ketone) | 3 weight parts |

Here, "Diabeam UK6035" (trade name), made by Mitsubishi Rayon Co., Ltd., was used as the urethane acrylate oligomer, "Aronix M315" (trade name), made by Toagosei Co., Ltd., was used as the isocyanuric acid EO modified triacrylate, and "Aronix M215" (trade name), made by Toagosei Co., Ltd., was used as the isocyanuric acid EO modified diacrylate.

An ultraviolet ray/electron beam curing type hard coat agent, with the composition given below, was then coated onto the light transmitting layer to form a coating film, and by heating at 60° C. in air for 3 minutes, the diluent in the coating film was removed to form an uncured hard coat layer.

| | |
|---|---|
| Reactive-group-modified colloidal silica | 100 weight parts |
| Dipentaerythritol hexaacrylate | 48 weight parts |
| Tetrahydrofurfuryl acrylate | 12 weight parts |
| Propylene glycol monomethyl ether acetate (non-reactive diluent) | 40 weight parts |
| Photopolymerization initiator (1-hydroxycyclohexylphenyl ketone) | 3 weight parts |

Here, with the reactive-group-modified colloidal silica, propylene glycol monomethyl ether acetate was used as the dispersant and the nonvolatile content was 40 weight %.

The following compounds were then added to 99.75 weight parts of the fluorine-based solvent, Fluorinert ("FC-77" (trade name), made by Sumitomo 3M Co. Ltd.) to prepare a lubricant solution.

| | |
|---|---|
| 2-(perfluoro-3,6,9-trioxatridecanoyloxy) ethyl methacrylate | 0.06 weight parts |
| 2-(perfluoro-9-methyldecyl)ethyl acrylate (made by Daikin Fine Chemical Laboratory, Ltd.) | 0.17 weight parts |
| Perfluorocyclohexyl acrylate (made by SynQuest Laboratories Inc.) | 0.02 weight parts |

The lubricant solution thus prepared was coated by spin coating onto the uncured hard coat layer to form a coating film, and the formed coating film was dried at 60° C. for 3 minutes to form an uncured lubricant layer. The 2-(perfluoro-3,6,9-trioxatridecanoyloxy)ethyl methacrylate was obtained by the esterification of 2-hydroxyethyl methacrylate using perfluoro-3,6,9-trioxatridecanoic acid in accordance to a routine procedure.

Then under a nitrogen gas flow, an electron beam was irradiated onto the uncured hard coat layer and the uncured lubricant layer to cure the hard coat layer and the lubricant layer simultaneously. As the electron beam irradiation device, "MinEB" (trade name), made by Ushio Electric Inc., was used with the electron beam acceleration voltage set to 100 kV and the irradiation dose set to 5Mrad. The oxygen concentration of the electron beam radiation atmosphere was 80 ppm.

After curing, the film thickness of the hard coat layer was 3.2 µm and the film thickness of the lubricant layer was approximately 25 nm. Here, the film thickness of the lubricant layer was measured by X-ray fluorescence analysis (XRF) using a perfluoropolyether ("Demnam" (trade name), made by Daikin Industries Ltd.) as a reference material.

An optical disk sample #1 having a hard coat layer and a lubricant layer formed thereon was thus formed.

Example 2

Besides using a lubricant solution with the following composition, an optical disk sample #2 was prepared in the same manner as in Example 1.

| | |
|---|---|
| n-octane | 99.8 weight parts |
| Silicone dimethacrylate ("X-22-164B" (trade name), made by Shin-Etsu Chemical Co., Ltd.) | 0.16 weight parts |
| (Acryloxypropyl)methylsiloxane/dimethyl siloxane copolymer ("UMS-182" (trade name), made by Gelest, Inc., (proportion of (acryloxypropylmethy)lsiloxane: 15 to 20 mole %) | 0.04 weight parts |

Example 3

In the same manner as in Example 1, a reflecting layer, a second dielectric layer, a recording layer, a first dielectric layer, and a light transmitting layer were formed on a surface of a polycarbonate substrate on which grooves and lands were formed.

An ultraviolet ray/electron beam curing type hard coat agent, with the composition given below, was then coated by spin coating onto the light transmitting layer to form a coating film, the diluent in the coating film was removed by heating at 60° C. in air for 3 minutes, and the coating film was then illuminated with ultraviolet rays to form a hard coat layer.

| | |
|---|---|
| Reactive-group-modified colloidal silica | 100 weight parts |
| Dipentaerythritol hexaacrylate | 48 weight parts |
| Tetrahydrofurfuryl acrylate | 12 weight parts |
| Acryloxypropyl-terminated polydimethylsiloxane ("DMS-U22" (trade name), made by Gelest, Inc., molecular weight: 1000 to 1200) | 0.125 weight parts |
| Propylene glycol monomethyl ether acetate (non-reactive diluent) | 40 weight parts |
| Photopolymerization initiator | 5 weight parts |

(1-hydroxycyclohexylphenyl ketone)

Here, with the reactive-group-modified colloidal silica, propylene glycol monomethyl ether acetate was used as the dispersant and the nonvolatile content was 40 weight %.

An optical disk sample #3 was thus formed.

Example 4

In the same manner as in Example 1, a reflecting layer, a second dielectric layer, a recording layer, a first dielectric layer, and a light transmitting layer were formed on a surface of a polycarbonate substrate on which grooves and lands were formed.

An ultraviolet ray/electron beam curing type hard coat agent, with the composition given below, was then coated by spin coating onto the light transmitting layer to form a coating film, the diluent in the coating film was removed by heating at 60° C. in air for 3 minutes, and the coating film was then illuminated with ultraviolet rays to form a hard coat layer.

| | |
|---|---|
| Reactive-group-modified colloidal silica | 100 weight parts |
| Dipentaerythritol hexaacrylate | 48 weight parts |
| Tetrahydrofurfuryl acrylate | 12 weight parts |
| Acryloxypropyl-terminated polydimethylsiloxane ("DMS-U22" (trade name), made by Gelest, Inc., molecular weight: 1000 to 1200) | 0.015 weight parts |
| Propylene glycol monomethyl ether acetate (non-reactive diluent) | 40 weight parts |
| Photopolymerization initiator (1-hydroxycyclohexylphenyl ketone) | 5 weight parts |

Here, with the reactive-group-modified colloidal silica, propylene glycol monomethyl ether acetate was used as the dispersant and the nonvolatile content was 40 weight %.

An optical disk sample #4 was thus formed.

Comparative Example 1

In the same manner as in Example 1, a reflecting layer, a second dielectric layer, a recording layer, a first dielectric layer, and a light transmitting layer were formed on a surface of a polycarbonate substrate on which grooves and lands were formed.

An ultraviolet ray/electron beam curing type hard coat agent, with the composition given below, was then coated by spin coating onto the light transmitting layer to form a coating film, the diluent in the coating film was removed by heating at 60° C. in air for 3 minutes, and the coating film was then illuminated with ultraviolet rays to form a hard coat layer.

| | |
|---|---|
| Reactive-group-modified colloidal silica | 100 weight parts |
| Dipentaerythritol hexaacrylate | 48 weight parts |
| Tetrahydrofurfuryl acrylate | 12 weight parts |
| Propylene glycol monomethyl ether acetate (non-reactive diluent) | 40 weight parts |
| Photopolymerization initiator (1-hydroxycyclohexylphenyl ketone) | 5 weight parts |

Here, with the reactive-group-modified colloidal silica, propylene glycol monomethyl ether acetate was used as the dispersant and the nonvolatile content was 40 weight %.

An optical disk sample #5 was thus formed.

[Measurement of Jitter]

Optical recording disk samples #1 to #5 were set successively in the optical recording medium evaluation device, "DDU1000" (trade name), made by Pulstec Industrial Co., Ltd., and using blue laser light of 405 nm wavelength as the recording laser light and using an objective lens with an NA (numerical aperture) of 0.85, the laser light was converged via the light transmitting layer to record data on each optical recording disk sample under the following conditions.

Recording linear velocity: 5.3 m/sec
Recorded signal: 1–7 modulated signal (minimum signal length: 2T)
Recording region: on-groove recording After the recording of the data, the same optical recording medium evaluation device was used to measure the jitter of the recorded signal in each optical recording disk sample.

The measurement results are indicated as the initial values of jitter in Table 2.

The artificial fingerprint adhesion (a) was then carried out on each optical disk sample. In forming the original plate for transfer of the artificial fingerprint transfer pattern, the substrate was heated at 60° C. for 3 minutes to remove the methoxypropanol, which is the unnecessary diluent in the coating film. The light incidence surface was then wiped by the wipe-off operation (b). As the facial tissues, "Kleenex" (trade name), made by Crecia Corp., was used. For wiping, the tissues were moved gradually from the center to the outer periphery of each sample while pressing at a force of 9N.

[Measurement of the Area Proportion Occupied by the Artificial Fingerprint Solution Adhered within a Unit Area of the Light Incidence Surface]

An optical microscope ("VK-8510" (trade name), made by Keyence Corp.) was used to observe the states of the artificial fingerprints that were transferred onto the top surfaces of the lubricant layers of optical recording disk samples #1 and #2 and the top surfaces of the hard coat layers of the optical recording disk samples #3 to #5 prior to wipe-off, and images of the artificial fingerprint solution were output using a printer ("VH-P40" (trade name), made by Keyence Corp.).

Each output image was input into a computer, and using the image processing analysis software, Win ROOF, made by Mitani Corp., the area proportion (%) with respect to the total area of the area of liquid drops of the artificial fingerprint solution with diameters of no less than 5 μm was measured.

The measurement results are shown in Table 1.

[Measurement of the Diameters of Liquid Drops of the Artificial Fingerprint Solution Adhered Onto the Light Incidence Surface]

Likewise using the image processing analysis software, Win ROOF, the maximum value of the diameters of the liquid drops of the artificial fingerprint solution that were adhered onto the top surface of a lubricant layer or the top surface of a hard coat layer was measured. Under the presumption that liquid drops of the artificial fingerprint solution that were adhered onto the top surface of a lubricant layer or the top surface of a hard coat layer are perfect circles, the diameter of a liquid drop of the artificial fingerprint solution was defined as the diameter of a perfect circle with an area equivalent to the area of the liquid drop of the artificial fingerprint solution that was adhered onto the top surface of a lubricant layer or the top surface of a hard coat layer. The measurement results are shown in Table 1.

[Measurement of the Similarity of Liquid Drops of the Artificial Fingerprint Solution Adhered onto the Light Incidence Surface to Circles]

Likewise using the image processing analysis software, Win ROOF, the peripheral lengths L and the areas S of liquid drops of diameters of no less than 20 μwere measured to evaluate the similarity of the liquid drops of the artificial fingerprint solution to circles by means of $4\pi \times S/L^2$. The measurement results are shown in Table 1.

TABLE 1

| | Examples 1 to 4, Comparative Example 1 | | | | |
| --- | --- | --- | --- | --- | --- |
| | Sample #1 | Sample #2 | Sample #3 | Sample #4 | Comparative Sample #5 |
| Area proportion (%) | 7.2 | 10.8 | 11.2 | 28.9 | 59.6 |
| Maximum diameter value (μm) | 31.2 | 48.2 | 52.5 | 79.6 | Could not be measured. |
| $4\pi S/L^2$ | 0.95 | 0.95 | 0.96 | 0.71 | Could not be measured. |

[Measurement of the Jitter of the Samples]

Using the abovementioned optical recording medium evaluation device, the jitter of the recorded signals after the adhesion of the artificial fingerprint solution and prior to performing the operation of wiping off the artificial fingerprint solution and of the recorded signals after repeating the wipe-off operation once, twice, five times, ten times, and fifteen times were measured for each optical recording disk sample. The measurement results are shown in Table 2.

TABLE 2

| | | | Number of times of wipe-off | | | | | |
| --- | --- | --- | --- | --- | --- | --- | --- | --- |
| | | Prior to fingerprint adhesion | 0 times | 1 time | 2 times | 5 times | 10 times | 15 times |
| Sample #1 | Jitter (%) | 7.2 | 11.8 | 7.3 | 7.2 | 7.2 | 7.2 | 7.2 |
| | Ratio with respect to initial value | — | 1.64 | 1.01 | 1.00 | 1.00 | 1.00 | 1.00 |
| Sample #2 | Jitter (%) | 7.2 | 14.1 | 8.9 | 7.8 | 7.1 | 7.1 | 7.1 |
| | Ratio with respect to initial value | — | 1.96 | 1.24 | 1.08 | 0.99 | 0.99 | 0.99 |
| Sample #3 | Jitter (%) | 7.2 | 15.1 | 11.6 | 9.2 | 7.8 | 7.2 | 7.1 |
| | Ratio with respect to initial value | — | 2.10 | 1.61 | 1.28 | 1.08 | 1.00 | 0.99 |
| Sample #4 | Jitter (%) | 7.2 | 16.6 | 13.4 | 10.5 | 8.1 | 7.4 | 7.2 |
| | Ratio with respect to initial value | — | 2.31 | 1.89 | 1.40 | 1.14 | 1.04 | 1.01 |
| Sample #5 | Jitter (%) | 7.2 | 18.9 | 17.0 | 15.6 | 12.1 | 10.3 | 7.9 |
| | Ratio with respect to initial value | — | 2.59 | 2.33 | 2.14 | 1.66 | 1.41 | 1.08 |

Since the artificial fingerprint solution has practically the same physical characteristics as the liquid making up sweat and skin oil, in other words, the fingerprints of humans, it is considered that the same results will be obtained even when fingerprints are adhered in place of the artificial fingerprint solution onto the light incidence surfaces of the optical recording disk samples.

It can be seen that with the optical recording disk samples #1 to #4, the jitter is improved to 1.14 times the initial value after the wipe-off operation is carried out five times. It can thus be understood that even in actual cases where fingerprints become adhered, by repeating the fingerprint wipe-off operation at least five times, the jitter, which had increased due to the adhesion of fingerprints onto the surface of the light incidence surface of the optical recording disk, can be lowered to a practical level, in other words, to 1.15 times the value of the jitter prior to the adhesion of the fingerprints.

Though it can be recognized that with the optical recording disk sample #5, the jitter is improved to 1.14 times the initial value after the operation of wiping off the artificial fingerprint solution is repeated fifteen times, since it is not practical to demand a user to repeat the wipe-off operation fifteen times when fingerprints become adhered onto the surface of the optical recording disk, it can be understood that with optical recording disk sample #5, it is difficult to avoid the worsening of jitter when fingerprints become adhered onto the top surface.

From the characteristics of sample #4 shown in Table 1, it is clear that in order to prevent the worsening of jitter by removing fingerprints by a normal wipe-off operation upon adhesion of fingerprints, the light incidence surface of an optical recording disk must have surface characteristics such that when the artificial fingerprint solution is adhered, the area proportion occupied by the artificial fingerprint solution adhered within a unit area of the light incidence surface will be no more than 29%, have surface characteristics such that the maximum value of the diameters of the liquid drops of the artificial fingerprint solution will be no more than 80 μm, and have surface characteristics such that the peripheral lengths and areas of the liquid drops of the abovementioned artificial fingerprint solution of diameters of no less than 20 μm will, on the average, be such that $4\pi S/L^2$, which indicates the similarity of a shape of a liquid drop of the artificial fingerprint solution to a circle, is no less than 0.70.

Examples 5 to 8 and Comparative Example 2

Storage tests were conducted in view of long term use or post-storage in an actual usage environment. In these tests, optical recording disks are stored over a predetermined amount of time while applying conditions of higher temperature and higher humidity than those of a normal usage environment to the optical recording disks to check the surface characteristics of the optical recording disks upon long term use or after storage in an actual usage environment and confirm the reliability under an actual usage environment. As Example 5, an optical disk sample #6 was prepared in the same manner as optical disk sample #1 of Embodiment 1 and this was stored for 50 hours under an environment of 80° C. and 85% relative humidity.

The artificial fingerprint adhesion (a) was then carried out, and as with Example 1, the area proportion occupied by the artificial fingerprint solution, the maximum value of the diameters of the liquid drops of the artificial fingerprint solution, and the peripheral lengths and areas ($4\pi S/L^2$) of the liquid drops of the abovementioned artificial fingerprint solution of diameters of no less than 20 μm were measured. The wipe-off operation (b) was then performed and jitter was measured in the same manner as with Example 1. Likewise as Examples 6, 7, and 8 and Comparative Example 2, optical disk samples #7, #8, #9, and #10 were prepared in the same manner as optical disk samples #2, #3, #4, and #5, and after storage for 50 hours under an environment of 80° C. and 85% relative humidity, were subject to the artificial fingerprint adhesion (a) and then the wipe-off operation (b). The measurement results of the area proportions, maximum diameter values, and $4\pi S/L^2$ are shown in Table 3. The jitter evaluation results are shown along with the number of times of wipe-off in Table 4.

TABLE 3

Examples 5 to 8, Comparative Example 2

|  | Sample #6 | Sample #7 | Sample #8 | Sample #9 | Sample #10 |
|---|---|---|---|---|---|
| Area proportion (%) | 8.0 | 11.2 | 14.3 | 29.2 | 59.6 |
| Maximum diameter value (μm) | 29.5 | 50.1 | 65.1 | 79.8 | Could not be measured. |
| $4\pi S/L^2$ | 0.96 | 0.95 | 0.82 | 0.69 | Could not be measured. |

TABLE 4

Examples 5 to 8, Comparative Example 2

| | | Prior to fingerprint adhesion | Number of times of wipe-off | | | | | |
| | | | 0 times | 1 time | 2 times | 5 times | 10 times | 15 times |
|---|---|---|---|---|---|---|---|---|
| Sample #6 | Jitter (%) | 7.2 | 12.0 | 7.3 | 7.2 | 7.2 | 7.2 | 7.2 |
| | Ratio with respect to initial value | — | 1.67 | 1.01 | 1.00 | 1.00 | 1.00 | 1.00 |
| Sample #7 | Jitter (%) | 7.2 | 14.7 | 9.0 | 8.1 | 7.1 | 7.1 | 7.1 |
| | Ratio with respect to initial value | — | 2.04 | 1.25 | 1.13 | 0.99 | 0.99 | 0.99 |
| Sample #8 | Jitter (%) | 7.2 | 16.0 | 12.2 | 9.5 | 7.9 | 7.2 | 7.1 |
| | Ratio with respect to initial value | — | 2.22 | 1.69 | 1.32 | 1.10 | 1.00 | 0.99 |
| Sample #9 | Jitter (%) | 7.1 | 17.2 | 14.1 | 11.8 | 8.7 | 8.1 | 7.2 |
| | Ratio with respect to initial value | — | 2.42 | 1.99 | 1.66 | 1.23 | 1.14 | 1.01 |
| Sample #10 | Jitter (%) | 7.3 | 19.0 | 16.9 | 15.8 | 12.6 | 11.0 | 8.1 |
| | Ratio with respect to initial value | — | 2.60 | 2.32 | 2.16 | 1.73 | 1.51 | 1.11 |

It was thus found that whereas with the optical recording disk samples #6 to #9, even after storage for 50 hours under an environment of 80° C. and 85% relative humidity, the jitter is improved to 1.14 times the initial value after the wipe-off operation is carried out five times, with the optical recording disk sample #10, the jitter is improved only to 1.51 times the initial value even when the wipe-of f operation is repeated ten times.

From the characteristics of sample #6 shown in Table 3, it is clear that in order to prevent the worsening of jitter by removing fingerprints by a normal wipe-off operation upon adhesion of fingerprints, the light incidence surface of an optical recording disk must have surface characteristics such that when the artificial fingerprint solution is adhered after storage for 50 hours under an environment of 80° C. and 85% relative humidity, the area proportion occupied by the artificial fingerprint solution adhered within a unit area of the light incidence surface will be no more than 30%, have surface characteristics such that the maximum value of the diameters of the liquid drops of the artificial fingerprint solution will be no more than 80 μ, and have surface characteristics such that the peripheral lengths and areas of the liquid drops of the abovementioned artificial fingerprint solution of diameters of no less than 20 μm will, on the average, be such that $4\pi S/L^2$ is no less than 0.69.

Examples 9 to 12 and Comparative Example 3

As Examples 9, 10, 11, and 12 and Comparative Example 3, optical disk samples #11, #12, #13, #14, and #15 were prepared in the same manner as optical disk samples #1, #2, #3, #4, and #5. Two of each sample were prepared. The prepared samples were stored for 50 hours under an environment of 80° C. and 85% relative humidity.

[Measurement of the Contact Angle of Triolein with Respect to the Top Surface of the Optical Recording Disk Sample]

Under an atmosphere of 25° C. and 50% relative humidity, 2.5 μl of triolein, made by Wako Pure Chemicals, Ltd., was dropped onto the top surface of one of the two optical recording disks #11 that had been subject to the storage test, and using the contact angle meter, "CAD" (trade name), made by Kyowa Interface Science Co., Ltd., the contact angle of triolein with respect to the top surface of optical recording disk sample #11 was measured in accordance to the static drop analysis method as set forth in JIS R3257:1999 with the water in the static drop analysis method as set forth in JIS R3257:1999 being replaced by triolein. The contact angle of triolein with respect to the top surface of the optical disk sample was measured likewise for the optical recording disk samples #12 to #15 after the storage test. The measurement results are shown in Table 5.

TABLE 5

Examples 9 to 12, Comparative Example 3

| | Contact angle (°) |
|---|---|
| Sample #11 | 74.5 |
| Sample #12 | 49.8 |
| Sample #13 | 40.2 |
| Sample #14 | 38.9 |
| Sample #15 | 16.2 |

[Tracking Control Test of the Disk Samples]

While measuring the contact angle of triolein with respect to the top surface of the optical disk sample, the artificial fingerprint solution was adhered onto the top surface of the other of the two optical recording disk samples #11, which had been subject to the storage test, to reproduce a condition where soiling matter due to a human fingerprint, etc. is adhered onto the top surface of optical recording disk sample #11, and in this state, a tracking control test was conducted on optical recording disk sample #11 to test whether or not normal tracking is possible.

First, the artificial fingerprint adhesion (a) was performed. The artificial fingerprint solution was thereby adhered onto the top surface of the optical recording disk sample #11 to reproduce a condition where a human fingerprint is adhered onto the optical recording disk. Optical recording disk sample #11 onto which the artificial fingerprint solution had been adhered was then set in the optical recording medium evaluation device "DDU1000" (trade name), made by Pulstec Industrial Co., Ltd., and using blue laser light of 405 nm wavelength as the laser light for reproduction of the guide tracks formed in the optical recording disk sample and using an objective lens with an NA (numerical aperture) of 0.85, the laser light was converged via the light transmitting layer to attempt tracking control wherein the laser light is made to follow a track positioned 40 mm in the radial direction from the center of the optical recording disk sample under the following conditions to judge whether or not normal tracking control is possible.

Linear Velocity: 5.3 m/sec

Laser Power: 0.30 mW

Tracking Error Signal Generating Method: Push-pull Method

A test of performing tracking control of 30 seconds was executed five times and if tracking could not be performed in three of the five times of tracking control, it was judged that normal tracking control was impossible.

TABLE 6

| | Enabling of tracking |
|---|---|
| Sample #11 | o |
| Sample #12 | o |
| Sample #13 | o |
| Sample #14 | o |
| Sample #15 | x |

The test results are shown in Table 6. In Table 6, "o" indicates that normal tracking control was possible and "x" indicates that normal tracking was impossible. Optical recording disk samples #12 to #15, on which the storage test had been carried out, were likewise subject to the adhesion of the artificial fingerprint solution and thereafter subject to the tracking control test. The measurement results are shown in Table 6.

Tables 5 and 6 clearly show that normal tracking control is possible with an optical recording disk sample with which the contact angle of triolein with respect to the top surface of the optical recording disk sample is no less than 38°.

It is thus clear that surface characteristics, such that the contact angle of triolein with respect to an optical recording disk's light incidence surface, onto which laser light is made incident, will be no less than 38°, are required in order to enable normal tracking control in a case where soiling matter due to human fingerprints, etc. is adhered onto the light incidence surface of the optical recording disk after storing the optical recording disk for 50 hours under an environment of 80° C. and 85% relative humidity and thus to enable normal tracking control in a case where fingerprints become adhered onto the light incidence surface of an optical recording disk after repeated use or long-term storage of the optical recording disk. It is thus clear that with an optical disk with which the contact angle is no less than 38°, even when fingerprints become adhered onto the light incidence surface after long-term storage, the reading of the tracks of the optical recording disk will not be prevented by the fingerprints that had become adhered onto the light incidence surface and normal tracking control can be executed.

Examples 13 to 16 and Comparative Example 4

As Examples 13, 14, 15, and 16 and Comparative Example 4, optical disk samples #16, #17, #18, #19, and #20 were prepared in the same manner as optical disk samples #1, #2, #3, #4, and #5. Two of each sample were prepared. The prepared samples were stored for 50 hours under an environment of 80° C. and 85% relative humidity.

The artificial fingerprint adhesion (a) was then performed on one disk of each sample. Then as with Example 1, jitter, the area proportion occupied by the artificial fingerprint solution, the maximum value of the diameters of the liquid drops of the artificial fingerprint solution, and the peripheral lengths and areas ($4\pi S/L2$) of the liquid drops of the abovementioned artificial fingerprint solution of diameters of no less than 20 μm were measured. The measurement results are shown in Table 7.

The artificial fingerprint adhesion (a) was then performed on the other disk of each sample. Then as with Example 9, the disks onto which the artificial fingerprint solution was adhered were subject to the tracking control test using the optical recording medium evaluation device "DDU1000" and under the same conditions. The measurement results are shown in Table 7.

TABLE 7

Examples 13 to 16, Comparative Example 4

| | Sample #16 | Sample #17 | Sample #18 | Sample #19 | Sample #20 |
|---|---|---|---|---|---|
| Area proportion (%) | 8.0 | 11.2 | 14.3 | 29.2 | 59.6 |
| Maximum diameter value (μm) | 29.5 | 50.1 | 65.1 | 79.8 | Could not be measured. |
| Circularity (average) | 0.96 | 0.95 | 0.82 | 0.69 | Could not be measured. |
| Enabling of tracking | ○ | ○ | ○ | ○ | x |

As shown in Table 7, it was found that with the optical recording disk samples #16 to #19 after the storage test, the are a proportion occupied by the artificial fingerprint solution adhered within a unit area of the top surface is no more than 30% and normal tracking control is possible. It is thus clear that in order to enable normal tracking control in a case where fingerprints become adhered onto the light incidence surface of an optical recording disk after repeated use or long-term storage of the optical recording disk, the light incidence surface of the optical recording disk must have surface characteristics such that the area proportion occupied by the artificial fingerprint solution adhered onto the light incidence surface of the optical recording disk will be no more than 30%.

Likewise, it is clear that in order to enable normal tracking control after storage, the light incidence surface of an optical recording disk must have surface characteristics such that the maximum value of the diameters of the liquid drops of the artificial fingerprint solution adhered onto the light incidence surface of the optical recording disk will be no more than 80 μm and have surface characteristics such that the average value of the relationship, $4\pi S/L2$, of the peripheral lengths and areas of the artificial fingerprint solution drops adhered onto the light incidence surface of the optical recording disk will be no less than 0.69.

Examples 17 to 20 and Comparative Example 5

As Examples 17, 18, 19, and 20 and Comparative Example 5, optical disk samples #21, #22, #23, #24, and #25 were prepared in the same manner as optical disk samples #1, #2, #3, #4, and #5. Two of each sample were prepared. The prepared samples were stored for 50 hours under an environment of 80° C. and 85% relative humidity.

[Rub Test of the Top Surfaces of the Disk Samples]

The rub test (c) was carried out on the top surfaces of the disks that were subject to the storage test. That is, using the self-adhering, long-fiber nonwoven fabric, "Bemcot Lint-free CT-8" (trade name), which is made by Asahi Kasei Corp. and contains cellulose as the main component, 1.0 ml of ethanol was dropped with a dropper onto parts of the nonwoven fabric centered about the part to be put in contact with the top surface of any of optical recording disk samples #21 to #25 and the rub test (c) was carried out on the top surfaces of optical recording disk samples #21 to #25. "Containing cellulose as the main component" means that practically no raw material besides cellulose is contained and specifically means that no less than 95% of the long-fiber nonwoven fabric is formed of cellulose.

With this invention, in the test of performing the storage test and the rub test in combination, operations, by which the lubricant substance existing on the top surface of an optical recording disk are wiped off, are performed as a test in assumption of a case where the optical recording disk is used repeatedly over a long term or stored over long term under an actual usage environment and to thereby check the reliability of the optical recording disk after long-term use or storage under an actual environment.

The contact angles of triolein were then measured as with Example 9. The measurement results are shown in Table 8.

TABLE 8

Examples 17 to 20, Comparative Example 5

| | Contact angle (°) |
|---|---|
| Sample #21 | 74.2 |
| Sample #22 | 49.6 |
| Sample #23 | 40.3 |
| Sample #24 | 38.5 |
| Sample #25 | 16.5 |

Also, the artificial fingerprint adhesion (a) was performed on the other disk of each sample. Then as with Example 9, the disks onto which the artificial fingerprint solution was adhered were subject to the tracking control test using the optical recording medium evaluation device "DDU1000" and under the same conditions. The measurement results are shown in Table 9.

TABLE 9

| | Enabling of tracking |
|---|---|
| Sample #21 | ○ |
| Sample #22 | ○ |
| Sample #23 | ○ |
| Sample #24 | ○ |
| Sample #25 | x |

Tables 8 and 9 clearly show that normal tracking control upon adhesion of the artificial fingerprint solution onto the top surface is possible with an optical recording disk sample with which the contact angle of triolein with respect to the top surface of the optical recording disk sample is no less than 38°.

It is thus clear that in order to enable normal tracking control in a case where fingerprints become adhered onto the light incidence surface of an optical recording disk after repeated use or long-term storage of the optical recording disk, the optical recording disk's light incidence surface, onto which laser light is made incident, must have surface characteristics such that the contact angle of triolein with respect to the light incidence surface of the optical recording disk sample will be no less than 38° after the performing of the rub test on the top surface of the light incidence surface.

Examples 21 to 24 and Comparative Example 6

As Examples 21, 22, 23, and 24 and Comparative Example 6, optical disk samples #26, #27, #28, #29, and #30 were prepared in the same manner as optical disk samples #1, #2, #3, #4, and #5. The prepared samples were stored for 50 hours under an environment of 80° C. and 85% relative humidity.

As with Example 17, the rub test (c) was then performed on the top surfaces of the disks on which the storage test was performed. Subsequently, the artificial fingerprint adhesion (a) was performed. Thereafter, as with Example 1, the area proportion occupied by the artificial fingerprint solution, the maximum value of the diameters of the liquid drops of the artificial fingerprint solution, and the peripheral lengths and areas ($4\pi S/L^2$) of the liquid drops of the abovementioned artificial fingerprint solution of diameters of no less than 20 μm were measured. The measurement results are shown in Table 10.

TABLE 10

Examples 21 to 24, Comparative Example 6

| | Sample #26 | Sample #27 | Sample #28 | Sample #29 | Sample #30 |
|---|---|---|---|---|---|
| Area proportion (%) | 8.3 | 11.9 | 14.9 | 29.5 | 59.6 |
| Maximum diameter value (μm) | 29.6 | 51.3 | 69.8 | 81.3 | Could not be measured. |
| Circularity (average) | 0.96 | 0.97 | 0.79 | 0.67 | Could not be measured. |
| Enabling of tracking | ○ | ○ | ○ | ○ | x |

Table 10 clearly shows that normal tracking control is possible with an optical recording disk sample with which the area proportion occupied by the artificial fingerprint solution is no more than 30%.

It is thus clear that the light incidence surface of an optical recording disk must have surface characteristics such that the area proportion, occupied by the artificial fingerprint solution that has been adhered onto the light incidence surface of the optical recording disk, will be no more than 30% in order to enable normal tracking control in a case where, after storing an optical recording disk for 50 hours under an environment of 80° C. and 85% relative humidity, the rub test (c) is performed and thereafter the artificial fingerprint adhesion (a) is performed to adhere fingerprints on the light incidence surface of the optical recording disk so that the influence of fingerprints adhered onto the light incidence surface will not be received even when fingerprints are adhered onto the light incidence surface of the optical recording after long-term repeated use or long-term storage of the optical recording disk.

Likewise, it is clear from Table 10 that the light incidence surface of an optical recording disk must have surface characteristics such that the maximum value of the diameters of the liquid drops of the artificial fingerprint solution adhered onto the light incidence surface will be no more than 82 μm and have surface characteristics such that the peripheral lengths and areas of the artificial fingerprint solution drops of diameters of no less than 20 μm will be such that the average value of $4\pi S/L^2$ is no less than 0.67.

Examples 25 to 28 and Comparative Example 7

As Examples 25, 26, 27, and 28 and Comparative Example 7, optical disk samples #31, #32, #33, #34, and #35 were prepared in the same manner as optical disk samples #1, #2, #3, #4, and #5. Two of each sample were prepared.

As with Example 17, the rub test (c) was then performed on the top surfaces of the disks. Then as with Example 9, measurements of the contact angle of triolein were made. The measurement results are shown in Table 11.

TABLE 11

Examples 25 to 28, Comparative Example 7

| | Contact angle (°) |
|---|---|
| Sample #31 | 74.1 |
| Sample #32 | 49.5 |
| Sample #33 | 47.2 |
| Sample #34 | 40.4 |
| Sample #35 | 16.6 |

Also, the artificial fingerprint adhesion (a) was performed on the other disk of each sample. Then as with Example 9, the disks onto which the artificial fingerprint solution was adhered were subject to the tracking control test using the optical recording medium evaluation device "DDU1000" and under the same conditions. The measurement results are shown in Table 12.

TABLE 12

| | Enabling of tracking |
|---|---|
| Sample #31 | ○ |
| Sample #32 | ○ |
| Sample #33 | ○ |
| Sample #34 | ○ |
| Sample #35 | x |

Tables 11 and 12 clearly show that normal tracking control is possible with optical recording disk samples with which the contact angle of triolein with respect to the top surface of the sample is no less than 40°.

Since the rub test (c) is performed in assumption of the case where an optical recording disk is used repeatedly over a long term under an actual usage environment, it is clear that with an optical recording disk having surface characteristics such that the contact angle of triolein with respect to the light incidence surface onto which laser light is made incident is no less than 40°, even when soiling matter, due to human fingerprints, etc., becomes adhered onto the light incidence surface, the reading of the tracks of the optical recording disk will not be impeded by the soiling matter that has become adhered onto the light incidence surface and normal tracking control can be executed.

Examples 29 to 32 and Comparative Example 8

As Examples 29, 30, 31, and 32 and Comparative Example 8, optical disk samples #36, #37, #38, #39, and #40 were prepared in the same manner as optical disk samples #1, #2, #3, #4, and #5.

As with Example 17, the rub test (c) was then performed on the top surfaces of the disk samples. Subsequently, the artificial fingerprint adhesion (a) was performed. Thereafter, as with Example 1, the area proportion occupied by the artificial fingerprint solution, the maximum value of the diameters of the liquid drops of the artificial fingerprint solution, and the peripheral lengths and areas ($4\pi S/L^2$) of the liquid drops of the abovementioned artificial fingerprint solution of diameters of no less than 20 μm were measured. The measurement results are shown in Table 13.

TABLE 13

Examples 29 to 32, Comparative Example 8

| | Sample #36 | Sample #37 | Sample #38 | Sample #39 | Sample #40 |
|---|---|---|---|---|---|
| Area proportion (%) | 7.8 | 11.0 | 13.1 | 29.7 | 59.6 |
| Maximum diameter value (μm) | 28.6 | 49.2 | 58.7 | 76.8 | Could not be measured. |
| Circularity (average) | 0.97 | 0.96 | 0.90 | 0.71 | Could not be measured. |
| Enabling of tracking | ○ | ○ | ○ | ○ | x |

Table 13 clearly shows that normal tracking control is possible with optical recording disk samples with which the area proportion occupied by the artificial fingerprint solution is no more than 30%.

Since the rub test (c) is performed in assumption of the case where an optical recording disk is used repeatedly over a long term under an actual usage environment, it is clear that with an optical recording disk having surface characteristics such that the area proportion occupied by the artificial fingerprint solution that has been adhered in a unit area of the light incidence surface is no more than 30%, even when soiling matter, due to human fingerprints, etc., becomes adhered onto the light incidence surface, the reading of the tracks of the optical recording disk will not be impeded by the soiling matter that has become adhered onto the light incidence surface and normal tracking control can be executed.

It is likewise clear that the light incidence surface of an optical recording disk must have surface characteristics such that the maximum value of the diameters of the liquid drops of the artificial fingerprint solution adhered onto the light incidence surface will be no more than 80 μm and have surface characteristics such that the peripheral lengths and areas of the artificial fingerprint solution drops of diameters of no less than 20 μwill be such that the average value of $4\pi S/L^2$ is no less than 0.71.

Examples 33 to 35 and Comparative Examples 9 to 11

As Example 33, besides using Irgacure 184 (made by Chiba Specialty Chemicals) as the polymerization initiator of the light transmitting layer and the hard coat layer and making the lubricant solution (antifoulant) have the composition indicated below, an optical disk sample #41 was prepared in the same manner as optical disk sample #1 of Example 1. The film thickness of the hard coat layer after curing was 2 μm and film thickness of the lubricant layer (top surface layer) was approximately 30 nm.

| (Lubricant solution) | |
|---|---|
| Perfluoropolyether diacrylate (acrylate modified product of "Fombrin Z DOL," made by Ausimont, Inc.; molecular weight: approx. 2000) | 1 weight part |
| 3-perfluorooctyl-2-hydroxypropyl acrylate (R-1833, made by Daikin Fine Chemical Laboratory, Ltd.) | 3 weight parts |
| Fluorine-based solvent (Fluorinert FC-77, made by Sumitomo 3M Co. Ltd.) | 1600 weight parts |

As Example 34, besides using Irgacure 184 (made by Chiba Specialty Chemicals) as the polymerization initiator of the hard coat layer and using 1.5 weight parts of a fluorine-based block copolymer (Modiper F600, made by NOF Corporation) in place of the 0.125 weight parts of acryloxypropyl-terminated polydimethylsiloxane, an optical disk sample #42 was prepared in the same manner as optical disk sample #3 of Example 3.

As Example 35, besides using 0.25 weight parts of a bifunctional silicone methacrylate (X-22-164A, made by Shin-Etsu Chemical Co., Ltd.) in place of the 1.5 weight parts of the fluorine-based block copolymer (Modiper F600, made by NOF Corporation), which is a component of the hard coat layer, an optical disk sample #43 was prepared in the same manner as optical disk sample #42 of Example 34.

As Comparative Example 9, besides using 0.05 weight parts of a bifunctional silicone methacrylate (X-22-164A, made by Shin-Etsu Chemical Co., Ltd.; molecular weight: 1500) in place of the 1.5 weight parts of the fluorine-based block copolymer (Modiper F600, made by NOF Corporation), an optical disk sample #44 was prepared in the same manner as optical disk sample #42 of Example 34.

As Comparative Example 10, besides using 0.025 weight parts of a bifunctional silicone methacrylate (X-22-164A, made by Shin-Etsu Chemical Co., Ltd.; molecular weight: 1500) in place of the 1.5 weight parts of the fluorine-based block copolymer (Modiper F600, made by NOF Corporation), an optical disk sample #45 was prepared in the same manner as optical disk sample #43 of Example 34.

As Comparative Example 11, besides not using the fluorine-based block copolymer (Modiper F600, made by NOF Corporation), an optical disk sample #46 was prepared in the same manner as optical disk sample #42 of Example 34.

[Adhesion of an Evaluation Dispersion Onto the Disk Samples]

An evaluation dispersion was prepared by mixing and stirring 0.4 weight parts of Kanto loam of Test Powder 1

Class 11 as defined in JIS Z8901 as a microparticulate substance, 1 weight part of triolein as a dispersion medium, and 10 weight parts of methoxypropanol as a diluent.

This evaluation dispersion was adhered by the procedure of A→B→C→D→E→F. Here, a adhesion operation of performing the two operations of D and E for reducing the adhesion amount of the dispersion in the abovementioned procedure shall be referred to expediently as adhesion level 3. A adhesion operation of performing the single operation of D for reducing the adhesion amount of the dispersion shall be referred to expediently as adhesion level 2. A adhesion operation of not performing the operations D and E for reducing the adhesion amount of the dispersion shall be referred to expediently as adhesion level 1. As the level becomes higher from adhesion level 1 to adhesion level 3, the amount of the evaluation dispersion that has been transferred and adhered onto the top surface of an optical disk to be evaluated decreases. Adhesion level 3 may be considered as being a fingerprint adhesion level that can occur in normal use of a disk by a user. Adhesion level 1 may be considered as being a level of high amount of fingerprint adhesion that will probably not occur in normal use of a disk by a user.

(Preparation of the Evaluation Dispersion)

The evaluation dispersion was prepared by mixing and stirring 0.4 weight parts of Kanto loam of Test Powder 1 Class 11 (median diameter: 1.6 µm to 2.3 µm) as defined in JIS Z8901 as a microparticulate substance, 1 weight part of triolein as a dispersion medium, and 10 weight parts of methoxypropanol as a diluent.

(Preparation of an Original Plate for Transferring the Evaluation Dispersion)

An original plate for transferring the evaluation dispersion was prepared as follows. 1 mL of the evaluation dispersion was sampled while stirring well with a magnetic stirrer and coated by spin coating onto a polycarbonate substrate (diameter: 120 mm, thickness: 1.2 mm). The spin coating was performed by dropping the 1 mL of the evaluation dispersion onto the substrate while rotating the substrate at 500 rpm for 3 seconds and then rotating at 250 rpm for 3 seconds immediately thereafter. This substrate was then heated at 60° C. for 3 minutes to completely remove the methoxypropanol, which is the unneeded diluent. The original plate for transferring the evaluation dispersion was thus obtained.

(Transfer of the Evaluation Dispersion Onto the Top Surfaces of the Disk Samples)

The transfer of the evaluation dispersion components onto the top surface of the hard coat layer or top surface layer of each disk sample was performed to adhesion level 3 as follows.

Adhesion Level 3:

A No. 1 silicone rubber stopper, the smaller end face (diameter: 12 mm) of which was roughened uniformly by a #240 abrasive paper (having performance equivalent to AA240 abrasive paper as defined in JIS R2651 or JIS R2652), was used as the artificial fingerprint transferring material. The roughened end face of the artificial fingerprint transferring material was pressed against the abovementioned original plate at a load of 4.9N for 10 seconds to transfer the evaluation dispersion components onto the abovementioned end face of the transferring material.

Thereafter, the abovementioned end face of the transferring material onto which the evaluation dispersion was adhered was pressed against a flat surface of a polycarbonate substrate at a load of 4.9N for 10 seconds to reduce the amount of evaluation dispersion components adhered onto the abovementioned end face of the transferring material. The abovementioned end face of the transferring material was then pressed again against a different location of the polycarbonate substrate at a load of 4.9N for 10 seconds to further reduce the amount of evaluation dispersion components adhered onto the abovementioned end face of the transferring material.

The abovementioned end face of the transferring material, onto which the evaluation dispersion components had been adhered, was then pressed for 10 seconds at a load of 4.9N against a location near 40 mm in the radial direction from the center of the top surface of the hard coat layer or top surface layer of each disk sample to transfer the evaluation dispersion components.

Furthermore for disk sample Nos. 1 and 3, the transfer of the evaluation dispersion components onto the top surface of the hard coat layer or top surface layer of each disk sample was also performed to adhesion level 1 as follows.

Adhesion Level 1:

The operations of reducing the amount of evaluation dispersion components adhered onto the transferring material in the above-described operations of adhesion level 3 were not carried out.

(Measurement of the Area Proportion Occupied by the Evaluation Dispersion Drops Adhered within a Unit Area of the Top Surface)

The states of the evaluation dispersion drops that were adhered onto the top surfaces of the respective disk samples were observed suing an optical microscope ("VK-8510" (tradename), made by Keyence Corp.) and their images were output with a printer ("VH-P40" (trade name), made by Keyence Corp.). Each image was then input into a computer and using the image processing analysis software, Win ROOF Ver. 3.61 Demo Version (made by Mitani Corp.), the proportion, with respect to the total area, of the area of the evaluation dispersion drop parts was measured. The results for adhesion level 3 is shown in Table 14 and the results for adhesion level 1 is shown in Table 15.

TABLE 14

Examples 33 to 35, Comparative Examples 9 to 11

| Disk No. | Adhesion level 3 Area proportion | Error rate - I bER-I judgment | Error rate - II bER-II judgment | Contact angle of triolein |
|---|---|---|---|---|
| #41 | 0.9% | $2 \times 10^{-6}$ good | $1 \times 10^{-7}$ good | 75° |
| #42 | 4.8% | $1 \times 10^{-5}$ good | $9 \times 10^{-5}$ good | — |
| #43 | 6.0% | $6 \times 10^{-5}$ good | $3 \times 10^{-2}$ poor | 50° |

TABLE 14-continued

Examples 33 to 35, Comparative Examples 9 to 11

| Disk No. | Adhesion level 3 Area proportion | Error rate - I bER-I judgment | Error rate - II bER-II judgment | Contact angle of triolein |
|---|---|---|---|---|
| #44 | 8.6% | $2 \times 10^{-3}$ poor | $2 \times 10^{-2}$ poor | 37° |
| #45 | 11.0% | $9 \times 10^{-3}$ poor | $4 \times 10^{-2}$ poor | 30° |
| #46 | 25.7% | $2 \times 10^{-2}$ poor | $1 \times 10^{-2}$ poor | 17° |

TABLE 15

| Disk No. | Adhesion level 1 Area proportion | Error rate - III bER-III judgment |
|---|---|---|
| #41 | 4.9% | $1 \times 10^{-5}$ good |
| #43 | 10.8% | $5 \times 10^{-2}$ poor |

[Evaluation of Disk Samples Nos. 1 to 6]

(Measurement of the Initial Error Rate)

After using the optical recording medium evaluation device ("DDU1000" (trade name), made by Pulstec Industrial Co., Ltd.) to perform recording onto each disk sample under the following conditions:

laser wavelength λ: 405 nm; objective lens NA: 0.85; modulation method: (1, 7) RLL; channel bit length: 0.12 μm; recording linear velocity: 5.3 m/s; channel clock: 66 MHz; recorded signal: random signal of 2T to 8T; data transferring rate: 36 Mbs; the bit-by-bit error rate (bER) was measured using the abovementioned evaluation device (initial error rate). The initial error rate of each disk sample was either 0 or $1 \times 10^{-7}$.

(Error Rate Measurement I)

After performing recording onto each disk sample under the same conditions as the above, evaluation dispersion drops were adhered by the above-described operation of adhesion level 3 onto the top surface of the hard coat layer or the top surface layer of each disk sample, and the bit-by-bit error rate—I (beR-I) was measured in the same manner as the above with the evaluation dispersion drops in the adhered state. Here, measurements were made with a gate corresponding to 4 msec being opened about parts on which the evaluation liquid drops were adhered.

(Error Rate Measurement II)

Evaluation dispersion drops were adhered by the above-described operation of adhesion level 3 onto the top surface of the hard coat layer or the top surface layer of each disk sample in the unrecorded state, and then recording was performed under the same conditions as the above with the evaluation dispersion drops in the adhered state. The bit-by-bit error rate—II (beR-II) was then measured in the same manner as the above. Here, measurements were made with a gate corresponding to 4 msec being opened about parts on which the evaluation liquid drops were adhered.

The measurement results of the above are shown in Table 14.

Table 14 shows that with this invention's disk sample Nos. 41 to 43, the error rates—I were $2 \times 10^{-6}$, $1 \times 10^{-5}$, and $6 \times 10^{-5}$, respectively, and within a practical range (no more than $1 \times 10^{-4}$) and that good reproduction is enabled in the state where the evaluation dispersion drops were adhered at adhesion level 3 after recording. That is, an optical disk, with which the area proportion is no more than 6% for adhesion level 3, has a high resistance against fingerprint adhesion and can be used satisfactorily at least as an optical disk dedicated to reproduction.

With this invention's preferable disk samples Nos. 41 and 42, even when recording was performed upon adhering the evaluation dispersion drops at adhesion level 3 in the unrecorded state, the error rates—II were $1 \times 10^{-7}$ and $9 \times 10^{-5}$, respectively, and within the practical range (no more than $1 \times 10^{-4}$), indicating that good recording and reproduction are enabled. That is, an optical disk, with which the area proportion is no more than 4.8% for adhesion level 3, has an even higher resistance against fingerprint adhesion and can be used satisfactorily as a once-only recordable optical disk or a rewritable optical disk.

When disk sample Nos. 41, 43, 44, 45, and 46were subject to static contact angle measurements using triolein as the measurement liquid under an environment of 20° C. and 60% RH, the values shown in Table 1 were obtained. The contact angle meter, "FACE CONACT-ANGLE METER," made by Kyowa Interface Science Co., Ltd. was used to make the measurements.

(Error Rate Measurement III)

For disk sample Nos. 41 and 43, evaluations at adhesion level 1 were made. Evaluation dispersion drops were adhered by the above-described operation of adhesion level 1 onto the top surface of the hard coat layer or the top surface layer of each disk sample in the unrecorded state, and then recording was performed under the same conditions as the above with the evaluation dispersion drops adhered. The bit-by-bit error rate—III (beR-III) was then measured in the same manner as the above. Here, measurements were made with a gate corresponding to 4 msec being opened about parts on which the evaluation liquid drops were adhered.

The measurement results of the above are shown in Table 15.

With this invention's preferable disk sample No. 41, even when recording was performed upon adhering the evaluation dispersion drops at adhesion level 1 in the unrecorded state, the error rate—III was $1 \times 10^{-5}$ and within the practical range (no more than $1 \times 10^{-4}$), indicating that good recording and reproduction are enabled. That is, an optical disk, with which the area proportion is no more than 4.9% for adhesion level 1, has an extremely high resistance against fingerprint adhesion.

As Example 35, besides forming the light transmitting layer from a polycarbonate sheet, a disk sample No. 47 was formed in the same manner as disk sample No. 41. Specifically, 2 μm of the same material as that of the light transmitting layer of disk sample No. 41 was coated on top, a polycarbonate sheet of 100 μthickness was set above this material, and ultraviolet rays were illuminated to cure the resin material layer. As the abovementioned polycarbonate sheet, Pure Ace, made by flow casting by Teijin Corp. was used.

When disk sample No. 47 was evaluated in the same manner as disk sample No. 41, the same results were obtained.

This invention is not limited to the above embodiments and examples and various modifications are possible within the scope of this invention indicated in the claims and needless to say, these fall within the scope of this invention.

The recording layer is not limited to a rewritable type recording layer formed by a phase-change material, and a write-once type recording layer, formed of an organic dye or inorganic material, and other known recording layers may be used instead. This invention is also applicable to magneto-optical media. The recording layer may also be the protruding and recessed parts of a reproduction type optical recording medium, with which signals are recorded in advance by means of pits or other protrusions and recesses in the surface of a substrate or a spacer layer.

With this invention, the hard coat layer does not have to be provided and the light transmitting layer may be arranged to have a function of protecting the optical recording disk. In this case, the light incidence surface for laser light is formed by the top surface of the light transmitting layer. By arranging the light transmitting layer to have the function of protecting the optical recording disk, the process of forming the hard coat layer can be eliminated and the optical recording disk manufacturing process can be simplified.

With this invention, in the case where the light incidence surface for laser light is formed by the top surface of the light transmitting layer, the light transmitting layer preferably contains, for example, the same inorganic microparticles as those contained in the hard coat layer or a large amount of a curable monomer with a molecular weight of less than 2000 as a component for making the light transmitting layer hard in order to prevent the flawing of the top surface of the light transmitting layer. Also in order to prevent the flawing of the top surface, the light transmitting layer may oppositely be made not hard but soft and provided with flexibility to thereby secure scratch resistance.

In the case where the light incidence surface for laser light is formed by the top surface of the light transmitting layer, the light transmitting layer preferably contains a lubricant, that is, the light transmitting layer preferably contains an active energy ray curing type silicone-based compound and/or fluorine based compound as a lubricant. Furthermore, a lubricant layer may be formed on top of the light transmitting layer and the light incidence surface may be formed by the top surface of the lubricant layer.

This invention is also applicable to an optical recording medium such as a DVD, with which the substrate and the light transmitting layer are close in thickness or an optical recording medium in which the recording layer, etc. are formed between the substrate and a dummy substrate.

[Effect(s) of the Invention]

By this invention, an optical recording disk, with which the worsening of jitter can be prevented effectively even when fingerprints become adhered onto a laser light incidence surface, can be provided.

What is claimed is:

1. An optical recording disk, comprising:
a substrate;
at least one recording layer, formed above said substrate;
a light transmitting layer, formed above said recording layer; and
a hard coat layer and/or a lubricant layer, formed above said light transmitting layer,
wherein said recording disk is configured to have surface characteristics such that when an original plate for transfer of artificial fingerprint pattern is prepared by preparing an artificial fingerprint solution by mixing and stirring 0.4 weight parts of Kanto loam of Test Powder 1 Class 11 as defined in JIS Z8901, 1 weight part of triolein, and 10 weight parts of methoxypropanol, taking approximately 1 ml of said artificial fingerprint solution thus prepared to spin coating said artificial fingerprint solution onto a polycarbonate substrate, with a thickness of 1.1 mm and a diameter 120 mm, while spinning said polycarbonate substrate at 500 rpm for 3 seconds and then spinning said polycarbonate substrate at 250 rpm for 3 seconds, to form a coating film, and heating at 60° C. for 3 minutes, an artificial fingerprint transferring material is prepared by uniformly scouring an end face of a 12 mm diameter silicone rubber stopper using abrasive paper of base material Cw, polishing material A, and grain size P240 as defined in JIS R6252 and adhering said artificial fingerprint solution onto said scoured end face of said artificial fingerprint transferring material by pressing said end face of said artificial fingerprint transferring material against said original plate for transfer of artificial fingerprint pattern at a load of 29 N for 10 seconds, said end face of said artificial fingerprint transferring material, onto which said artificial fingerprint solution has been adhered, is pressed for 10 seconds at a load of 29 N against a position 40 mm in the radial direction from the center of said optical recording disk's light incidence surface, onto which laser light is to be made incident, to adhere said artificial fingerprint solution onto said light incidence surface, and an operation, of pressing an end face of a 16 mm diameter silicone rubber stopper across eight overlapped facial tissues against said light incidence surface, onto which said artificial fingerprint solution has been adhered, at a pressure 4.9 N and moving said light incidence surface and said silicone rubber stopper relative to each other to wipe off said artificial fingerprint solution that has been adhered onto said light incidence surface, is repeated five times, jitter becomes no more than 1.15 times that prior to the adhesion of said artificial fingerprint solution.

2. An optical recording disk, comprising:
a substrate;
at least one recording layer, formed above said substrate;
a light transmitting layer, formed above said recording layer; and
a hard coat layer and/or a lubricant layer, formed above said light transmitting layer,
wherein said recording disk is configured to have surface characteristics such that when, after storing for 50 hours under an environment of 80° C. and 85% relative humidity, an original plate for transfer of artificial fingerprint pattern is prepared by preparing an artificial fingerprint solution by mixing and stirring 0.4 weight parts of Kanto loam of Test Powder 1 Class 11 as defined in JIS Z8901, 1 weight part of triolein, and 10 weight parts of methoxypropanol, taking approximately 1 ml of said artificial fingerprint solution thus prepared to spin coat said artificial fingerprint solution onto a polycarbonate substrate, with a thickness of 1.1 mm and a diameter 120 mm, while spinning said polycarbonate substrate at 500 rpm for 3 seconds and then spinning said polycarbonate substrate at 250 rpm for 3 seconds, to form a coating film, and heating at 60°

C. for 3 minutes, an artificial fingerprint transferring material is prepared by uniformly scouring an end face of a 12 mm diameter silicone rubber stopper using abrasive paper of base material Cw, polishing material A, and grain size P240 as defined in JIS R6252 and adhering said artificial fingerprint solution onto said scoured end face of said artificial fingerprint transferring material by pressing said end face of said artificial fingerprint transferring material against said original plate for transfer of artificial fingerprint pattern at a load of 29 N for 10 seconds, said end face of said artificial fingerprint transferring material, onto which said artificial fingerprint solution has been adhered, is pressed for 10 seconds at a load of 29 N against a position 40 mm in the radial direction from the center of said optical recording disk's light incidence surface, onto which laser light is to be made incident, to adhere said artificial fingerprint solution onto said light incidence surface, and an operation, of pressing an end face of a 16 mm diameter silicone rubber stopper across eight overlapped facial tissues against said light incidence surface, onto which said artificial fingerprint solution has been adhered, at a pressure 4.9 N and moving said light incidence surface and said silicone rubber stopper relative to each other to wipe off said artificial fingerprint solution that has been adhered onto said light incidence surface, is repeated ten times, jitter becomes no more than 1.15 times that prior to the adhesion of said artificial fingerprint solution.

3. An optical recording disk, comprising:
a substrate;
at least one recording layer, formed above said substrate;
a light transmitting layer, formed above said recording layer; and
a hard coat layer and/or a lubricant layer, formed above said light transmitting layer,
wherein said optical recording disk is configured to have surface characteristics such that after storing for 50 hours under an environment of 80° C. and 85% relative humidity, the contact angle of triolein with respect to said optical recording disk's light incidence surface, onto which laser light is made incident, is no less than 38°.

4. An optical recording disk, comprising:
a substrate;
at least one recording layer, formed above said substrate;
a light transmitting layer, formed above said recording layer; and
a hard coat layer and/or a lubricant layer, formed above said light transmitting layer,
wherein said optical recording disk is configured to have surface characteristics such that, when, after storing for 50 hours under an environment of 80° C. and 85% relative humidity, an original plate for transfer of artificial fingerprint pattern is prepared by preparing an artificial fingerprint solution by mixing and stirring 0.4 weight parts of Kanto loam of Test Powder 1 Class 11 as defined in JIS Z8901, 1 weight part of triolein, and 10 weight parts of methoxypropanol, taking approximately 1 ml of said artificial fingerprint solution thus prepared to spin coat said artificial fingerprint solution onto a polycarbonate substrate, with a thickness of 1.1 mm and a diameter 120 mm, while spinning said polycarbonate substrate at 500 rpm for 3 seconds and then spinning said polycarbonate substrate at 250 rpm for 3 seconds, to form a coating film, and heating at 60° C. for 3 minutes, an artificial fingerprint transferring material is prepared by uniformly scouring an end face of a 12 mm diameter silicone rubber stopper using abrasive paper of base material Cw, polishing material A, and grain size P240 as defined in JIS R6252 and adhering said artificial fingerprint solution onto said scoured end face of said artificial fingerprint transferring material by pressing said end face of said artificial fingerprint transferring material against said original plate for transfer of artificial fingerprint pattern at a load of 29 N for 10 seconds, and said end face of said artificial fingerprint transferring material, onto which said artificial fingerprint solution has been adhered, is pressed for 10 seconds at a load of 29 N against a position 40 mm in the radial direction from the center of said optical recording disk's light incidence surface, onto which laser light is to be made incident, to adhere said artificial fingerprint solution onto said light incidence surface, the area proportion occupied by said artificial fingerprint solution adhered within a unit area of said light incidence surface is no more than 30%.

5. An optical recording disk, comprising:
a substrate;
one recording layer, formed above said substrate;
a light transmitting layer, formed above said recording layer; and
a hard coat layer and/or a lubricant layer, formed above said light transmitting layer,
wherein said optical recording disk is configured to have surface characteristics such that when, after storing for 50 hours under an environment of 80° C. and 85% relative humidity, a long-fiber, self-adhering nonwoven fabric, having cellulose as the main component, is soaked with ethanol, said long-fiber, self-adhering nonwoven fabric soaked with ethanol is pressed against said optical recording disk's light incidence surface, onto which laser light is to be made incident, at a load of $4.9 \text{ N} \pm 0.1 \text{ N/cm}^2$, and said light incidence surface is rubbed with said long-fiber, self-adhering nonwoven fabric by moving said long-fiber, self-adhering nonwoven fabric and said light incidence surface relative to each other for ten reciprocations, the contact angle of triolein with respect to the light incidence surface, onto which laser light is made incident, is no less than 38°.

6. An optical recording disk, comprising:
a substrate;
one recording layer, formed above said substrate;
a light transmitting layer, formed above said recording layer; and
a hard coat layer and/or a lubricant layer, formed above said light transmitting layer,
wherein said recording disk is configured to have surface characteristics such that when, after storing for 50 hours under an environment of 80° C. and 85% relative humidity, a long-fiber, self-adhering nonwoven fabric, having cellulose as the main component, is soaked with ethanol, said long-fiber, self-adhering nonwoven fabric soaked with ethanol is pressed against said optical recording disk's light incidence surface, onto which laser light is to be made incident, at a load of $4.9 \text{ N} \pm 0.1 \text{ N/cm}^2$, and said light incidence surface is rubbed with said long-fiber, self-adhering nonwoven fabric by moving said long-fiber, self-adhering nonwoven fabric and said light incidence surface relative to each other for ten reciprocations, and thereafter an original plate for transfer of artificial fingerprint pattern is prepared by preparing an artificial fingerprint solution by mixing and stirring 0.4 weight parts of Kanto loam of Test Powder 1 Class 11 as defined in JIS Z8901, 1 weight part of triolein, and 10 weight parts of methoxypropanol, taking approximately 1 ml of said artificial fingerprint solution thus prepared to spin coat said artificial fingerprint solution onto a polycarbonate substrate, with a thickness of 1.1 mm and a diameter 120 mm, while spinning said polycarbonate substrate at 500 rpm for 3 seconds and then spinning said polycarbonate substrate at 250 rpm for 3 seconds, to form a coating film, and heating at 60° C. for 3 minutes, an artificial fingerprint transferring material is prepared by uniformly scouring an end face of a 12 mm diameter silicone rubber stopper using abrasive paper of base material Cw, polishing material A, and grain size P240 as defined in JIS R6252 and adhering said artificial fingerprint solution onto said scoured end face of said artificial fingerprint transferring material by pressing said end face of said artificial fingerprint transferring material against said original plate for transfer of artificial fingerprint pattern at a load of 29 N for 10 seconds, and said end face of said artificial fingerprint transferring material, onto which said artificial fingerprint solution has been adhered, is pressed for 10 seconds at a load of 29 N against a position 40 mm in the radial direction from the center of said optical recording disk's light incidence surface, onto which laser light is to be made incident, to adhere said artificial fingerprint solution onto said light incidence surface, the area proportion occupied by said artificial fingerprint solution adhered within a unit area of said light incidence surface is no more than 30%.

7. An optical recording disk, comprising:
a substrate;
one recording layer, formed above said substrate; and
a light transmitting layer, formed above said recording layer; and
a hard coat layer and/or a lubricant layer, formed above said light transmitting layer,
wherein said optical recording disk is configured to have surface characteristics such that when a long-fiber, self-adhering nonwoven fabric, having cellulose as the main component, is soaked with ethanol, said long-fiber, self-adhering nonwoven fabric soaked with ethanol is pressed against said optical recording disk's light incidence surface, onto which laser light is to be made incident, at a load of 4.9 N±0.1 N/cm$^2$, and said light incidence surface is rubbed with said long-fiber, self-adhering nonwoven fabric by moving said long-fiber, self-adhering nonwoven fabric and said light incidence surface relative to each other for ten reciprocations, the contact angle of triolein with respect to the light incidence surface, onto which laser light is made incident, is no less than 40°.

8. An optical recording disk, comprising:
a substrate;
one recording layer, formed above said substrate;
a light transmitting layer, formed above said recording layer; and
a hard coat layer and/or a lubricant layer, formed above said light transmitting layer,
wherein said optical recording disk is configured to have surface characteristics such that when a long-fiber, self-adhering nonwoven fabric, having cellulose as the main component, is soaked with ethanol, said long-fiber, self-adhering nonwoven fabric soaked with ethanol is pressed against said optical recording disk's light incidence surface, onto which laser light is to be made incident, at a load of 4.9 N±0.1 N/cm$^2$, and said light incidence surface is rubbed with said long-fiber, self-adhering nonwoven fabric by moving said long-fiber, self-adhering nonwoven fabric and said light incidence surface relative to each other for ten reciprocations and thereafter an original plate for transfer of artificial fingerprint pattern is prepared by preparing an artificial fingerprint solution by mixing and stirring 0.4 weight parts of Kanto loam of Test Powder 1 Class 11 as defined in JIS Z8901, 1 weight part of triolein, and 10 weight parts of methoxypropanol, taking approximately 1 ml of said artificial fingerprint solution thus prepared to spin coat said artificial fingerprint solution onto a polycarbonate substrate, with a thickness of 1.1 mm and a diameter 120 mm, while spinning said polycarbonate substrate at 500 rpm for 3 seconds and then spinning said polycarbonate substrate at 250 rpm for 3 seconds, to form a coating film, and heating at 60° C. for 3 minutes, an artificial fingerprint transferring material is prepared by uniformly scouring an end face of a 12 mm diameter silicone rubber stopper using abrasive paper of base material Cw, polishing material A, and grain size P240 as defined in JIS R6252 and adhering said artificial fingerprint solution onto said scoured end face of said artificial fingerprint transferring material by pressing said end face of said artificial fingerprint transferring material against said original plate for transfer of artificial fingerprint pattern at a load of 29 N for 10 seconds, and said end face of said artificial fingerprint transferring material, onto which said artificial fingerprint solution has been adhered, is pressed for 10 seconds at a load of 29 N against a position 40 mm in the radial direction from the center of said optical recording disk's light incidence surface, onto which laser light is to be made incident, to adhere said artificial fingerprint solution onto said light incidence surface, the area proportion occupied by said artificial fingerprint solution adhered within a unit area of said light incidence surface is no more than 30%.

9. An optical information medium comprising:
a hard coat layer and/or a lubricant layer; and
a recording and/or reproduction beam incidence side surface configured to have surface characteristics such that when an evaluation dispersion, containing 0.4 weight parts of Kanto loam of Test Powder 1 Class 11 as defined in JIS Z8901 as a microparticulate substance, 1 weight part of triolein as a dispersion medium, and 10 ; weight parts of methoxypropanol as a diluent, is adhered onto the recording and/or reproduction beam incidence side surface of the optical information medium by the steps of:
coating the evaluation dispersion by spin coating onto a polycarbonate substrate, which is to serve as an original plate for evaluation dispersion transfer;
preparing a transferring material made of silicone rubber;
pressing the transferring material at a fixed load of 4.9 N for 10 seconds against the prepared original plate's surface, on which the evaluation dispersion was coated, to transfer the evaluation dispersion components onto the transferring material;
pressing the transferring material, onto which the evaluation dispersion components have been transferred, at a fixed load of 4.9 N for 10 seconds against a surface of a polycarbonate substrate for adhesion amount reduction to reduce the adhesion amount of the evaluation dispersion components;

pressing the transferring material, with which the adhesion amount of the evaluation dispersion components have been reduced, at a fixed load of 4.9 N for 10 seconds against another location of the surface of the polycarbonate substrate for adhesion amount reduction to further reduce the adhesion amount of the evaluation dispersion components; and pressing the transferring material, with which the adhesion amount of the evaluation dispersion components have been reduced twice, at a fixed load of 4.9 N for 10 seconds against the recording and/or reproduction beam incidence side surface of the optical information medium to adhere the evaluation dispersion components onto said surface of the optical information medium;

the area proportion occupied by the adhered evaluation dispersion drops with respect to the unit area of the surface on which the adhesion operation was performed is no more than 6%.

* * * * *